[12] United States Patent  
Kiyomizu et al.

(10) Patent No.: US 9,292,727 B2  
(45) Date of Patent: Mar. 22, 2016

(54) BLOOD VESSEL IMAGE TAKING DEVICE

(71) Applicant: HITACHI INDUSTRY & CONTROL SOLUTIONS, LTD., Ibaraki (JP)

(72) Inventors: Harumi Kiyomizu, Tokyo (JP); Naoto Miura, Tokyo (JP); Akio Nagasaka, Tokyo (JP); Takafumi Miyatake, Tokyo (JP); Yusuke Matsuda, Tokyo (JP)

(73) Assignee: HITACHI INDUSTRY & CONTROL SOLUTIONS, LTD., Ibaraki (JP)

(*) Notice: Subject to any disclaimer, the term of this patent is extended or adjusted under 35 U.S.C. 154(b) by 264 days.

(21) Appl. No.: 14/177,250

(22) Filed: Feb. 11, 2014

(65) Prior Publication Data  
US 2014/0286541 A1 Sep. 25, 2014

(30) Foreign Application Priority Data  
Mar. 22, 2013 (JP) ................ 2013-059283

(51) Int. Cl.  
G06K 9/62 (2006.01)  
G06K 9/00 (2006.01)  
G06K 9/20 (2006.01)

(52) U.S. Cl.  
CPC .......... G06K 9/00033 (2013.01); G06K 9/2027 (2013.01); G06K 2009/0006 (2013.01); G06K 2009/00932 (2013.01)

(58) Field of Classification Search  
None  
See application file for complete search history.

(56) References Cited

U.S. PATENT DOCUMENTS

| 7,876,929 B2* | 1/2011 | Matsumura .......... A61N 5/1172 382/115 |
| 8,396,258 B2* | 3/2013 | Fujisawa ............ G06K 9/00013 382/115 |
| 2008/0031497 A1 | 2/2008 | Kishigami et al. |
| 2008/0317293 A1* | 12/2008 | Sakurai .............. G06K 9/00013 382/115 |
| 2009/0174766 A1 | 7/2009 | Kiyomizu et al. |
| 2011/0188711 A1* | 8/2011 | Miura ................. A61B 5/02007 382/115 |
| 2011/0254941 A1 | 10/2011 | Kiyomizu et al. |
| 2011/0299740 A1* | 12/2011 | Mori ................... A61B 5/0059 382/115 |
| 2012/0121141 A1 | 5/2012 | Miura et al. |
| 2012/0195477 A1* | 8/2012 | Kiyomizu .......... G06K 9/00013 382/124 |
| 2013/0216105 A1 | 8/2013 | Nagasaka et al. |

FOREIGN PATENT DOCUMENTS

| JP | 2002-83298 A | 3/2002 |
| JP | 2008-36058 A | 2/2008 |
| JP | 2008-65570 A | 3/2008 |
| JP | 2009-9354 A | 1/2009 |
| JP | 2009-87263 A | 4/2009 |
| JP | 2009-289287 A | 12/2009 |
| JP | 2010-97483 A | 4/2010 |
| JP | 2012-212435 A | 11/2012 |
| JP | 2013-33555 A | 2/2013 |

* cited by examiner

Primary Examiner — Brian P Werner  
(74) Attorney, Agent, or Firm — Baker Botts L.L.P.

(57) ABSTRACT

A blood vessel image taking device including a finger presentation area configured at a surface of a cabinet, plural light sources arranged at the finger presentation area for irradiating a presented finger with a light ray, a light quantity controlling unit for controlling light quantities of the plural light sources, an opening portion configured at the finger presentation area, and an image taking unit for taking an image of the light ray from the light source portion passing through the opening portion and irradiated to the finger, in which portions of the finger presentation area are a tip end presentation area for presenting a tip end side of the finger, and a root presentation area for presenting a root side of the finger.

15 Claims, 18 Drawing Sheets

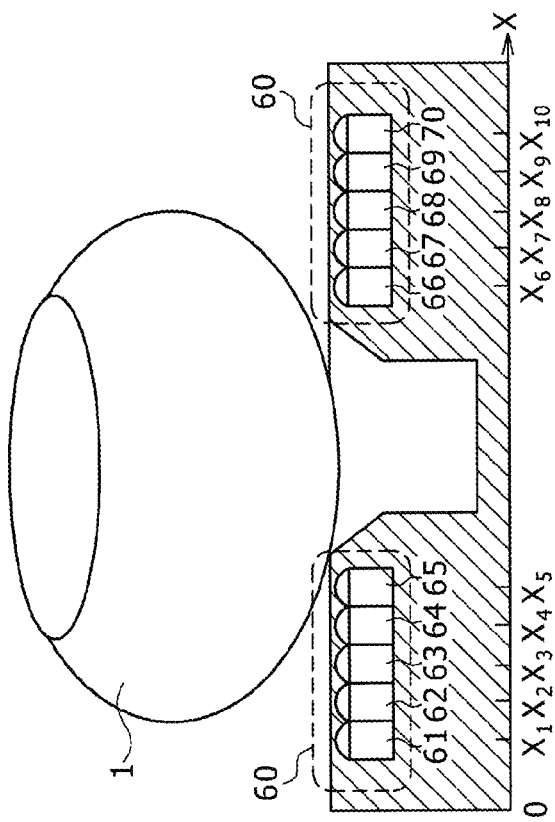
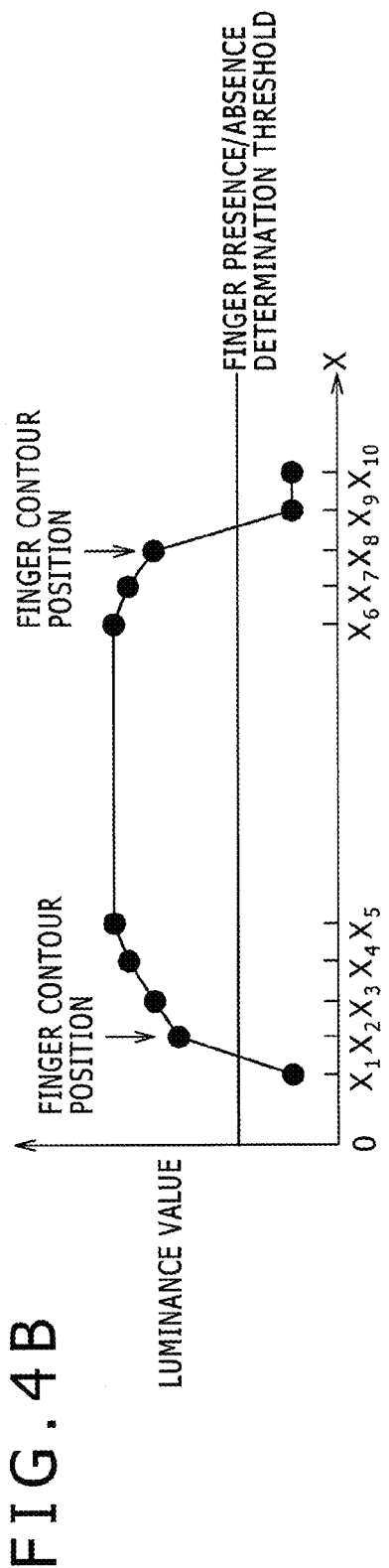
FIG. 4A
FIG. 4B

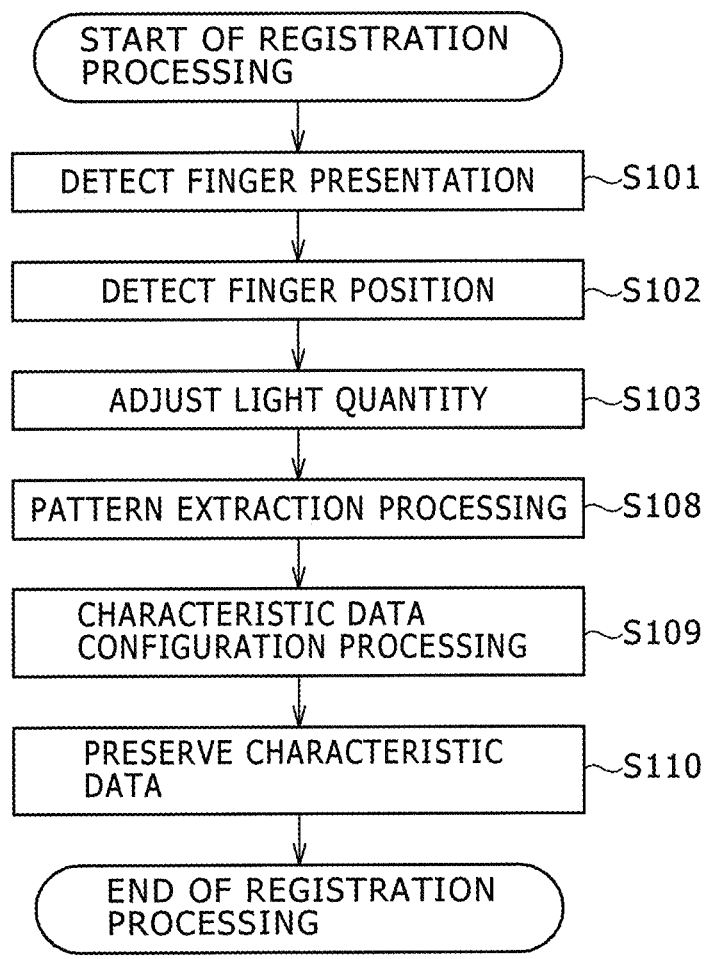

BLOOD VESSEL IMAGE TAKING DEVICE

CROSS-REFERENCE TO RELATED APPLICATION

This application claims the priority of Japanese Patent Application No. 2013-059283 filed Mar. 22, 2013, which is incorporated herein by reference in its entirety.

BACKGROUND

The present invention relates to a personal authentication device using a living body, particularly relates to a technology of authenticating a person by utilizing a blood vessel pattern which is obtained by taking an image of light that transmits through a living body.

In recent years, importance is set on security concerning personal information. Attention is attracted on biometric authentication as a personal authentication technology ensuring security. The biometric authentication is a technology of executing authentication by using living body information of a human being, and is excellent in availability and secrecy.

There is known authentication using the fingerprint, the iris, voice, face, a vein of the back of the hand, or a vein of the finger as biometric authentication technologies of background arts. Among them, the biometric authentication using the vein is excellent in forgery resistance since internal information of a living body is used.

In the following, a description will particularly be given of a personal authentication device using the vein of the finger. When personal authentication is carried by using a finger vein authentication device, first, a user presents the finger on the authentication device. The finger vein authentication device irradiates the finger with an infrared ray. The infrared ray is scattered at inside of the finger, thereafter, transmitted to outside. Then, the finger vein authentication device takes an image of the infrared ray that is transmitted to a palm side of the finger. At this occasion, hemoglobin in blood absorbs the infrared ray more than a surrounding tissue. Therefore, the light transmitted to the palm side finger has a contrasting difference between weak light which is attenuated by passing through the vein part, and strong light which gets away from a part without vein and is not attenuated. Therefore, an image taken by the finger vein authentication device visualizes the blood vessel (finger vein) which is distributed below the skin on the palm side of the finger as a dark shadow pattern (finger vein pattern). The finger vein authentication device carries out personal authentication by previously registering a characteristic of the finger vein pattern, and calculating a correlation between the finger vein pattern of a user presented in authentication and a previously registered characteristic.

As a background art of a finger vein authentication device of this kind, for example, Japanese Unexamined Patent Application Publication No. 2002-083298 describes a method of correcting a position of a finger or correcting rotation thereof by extracting a contour position of the finger for realizing a highly accurate authentication device. Japanese Unexamined Patent Application Publication No. 2009-289287 describes a method of installing a rod-like marking in a device and measuring an area of concealing a marker by a finger for calculating a thickness of the finger. Japanese Unexamined Patent Application Publication No. 2008-065570 describes that a position of a finger is calculated by installing cameras at a bottom face and a side face of the finger and using images taken from different positions. Japanese Unexamined Patent Application Publication No. 2008-036058 describes an example of using a microlens array for thinning an authentication device.

SUMMARY

As described above, there is known the position correcting method using the contour information of the finger as the position correcting method in the finger vein authentication. The authentication device of the background art specifies a position of a finger by taking an image including not only the vein pattern but a contour of the finger and extracting the contour information of the taken image when the vein image is taken. Therefore, the authentication device of the background art needs to take the image of a wide range which images a total of the finger of an authentication object. It is necessary to enlarge a distance between a subject and a camera by a constant value or more in order to take the image of the wide range. Therefore, there poses a problem of the authentication device of the background art that a device size is enlarged. There is a method of using a microlens array or a method of using a wide-angle lens as a method of downsizing a device by shortening a distance between a subject and a camera. However, there remains a problem that the lens is expensive, or the image is distorted.

It is an object of the present invention to provide a personal authentication device, a personal authentication system, and an operation device of executing personal authentication which can detect a position or a shape of a finger even when a finger contour is not taken in an taken image in order to realize a highly accurate and thin authentication device at low cost.

In order to address the problem, for example, a configuration described in the scope of claims is adopted. Although the application includes plural units of addressing the problem, when an example thereof is pointed out, there is provided a blood vessel image taking device including a finger presentation area configured at a surface of a cabinet, plural light sources arranged at the finger presentation area for irradiating a presented finger with a light ray, a light quantity controlling unit for controlling light quantities of the plural light sources, an opening portion configured at the finger presentation area, and an image taking unit for taking an image of the light ray from the light source portion passing through the opening portion and irradiated to the finger, in which portions of the finger presentation area are a tip end presentation area for presenting a tip end side of the finger, and a root presentation area for presenting a root side of the finger, in a case of defining a direction directed from a side of the tip end presentation area to a side of the root presentation area as a vertical direction, the plural light sources are aligned in a horizontal direction in a side direction of the opening portion, the light quantity controlling unit irradiates the light rays from the plural light sources while changing timings, the image taking unit respectively takes the images based on the respective light rays from the plural light sources, and a contour position of the presented finger in the finger presentation area is detected based on respective luminance values of the plural images.

According to the present invention, a position or a shape of a finger of an authentication object can be calculated by a low operation load, and even in a case of positionally shifting the finger, the position of the finger in the image can be corrected. Thereby, a highly accurate authentication can be carried out.

The device can be downsized and thinned, and an improvement in an availability and a variety of uses can be anticipated.

BRIEF DESCRIPTION OF THE DRAWINGS

FIGS. 3A, 3B, 3C, and 3D show an example of an image which is taken when a light source is switched on;

FIGS. 4A and 4B show an example of a change in a luminance of an image which is taken when a light source is switched on;

FIG. 5 shows an example of a flowchart of a registration processing;

DETAILED DESCRIPTION OF THE PREFERRED EMBODIMENTS

An explanation will be given of embodiments in reference to the drawings as follows. Incidentally, although an explanation will be given of an authentication method particularly using a vein of a finger in respective embodiments, the method is naturally applicable also to a case of a different authentication object part of a living body such as the palm or the wrist.

First Embodiment

Figure 1B:
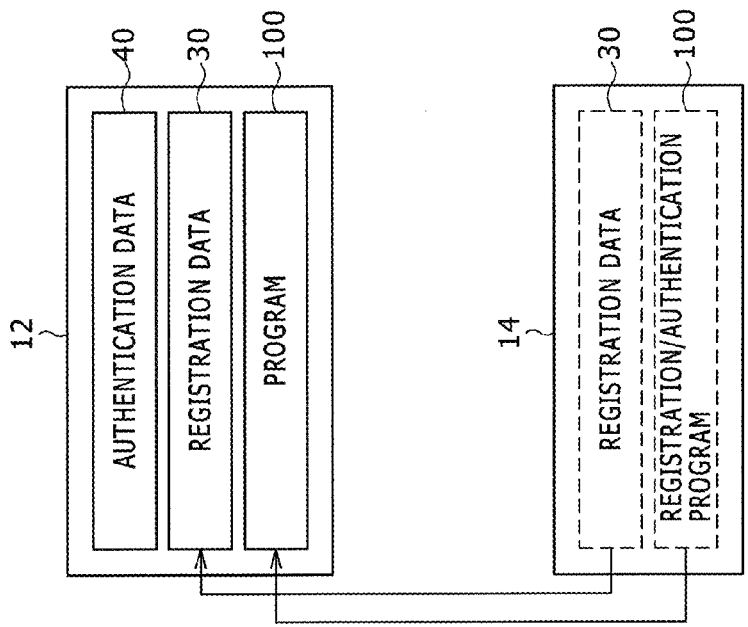
FIGS. 1A and 1B are outline configuration views of a finger vein authentication system.
Figure 1A:
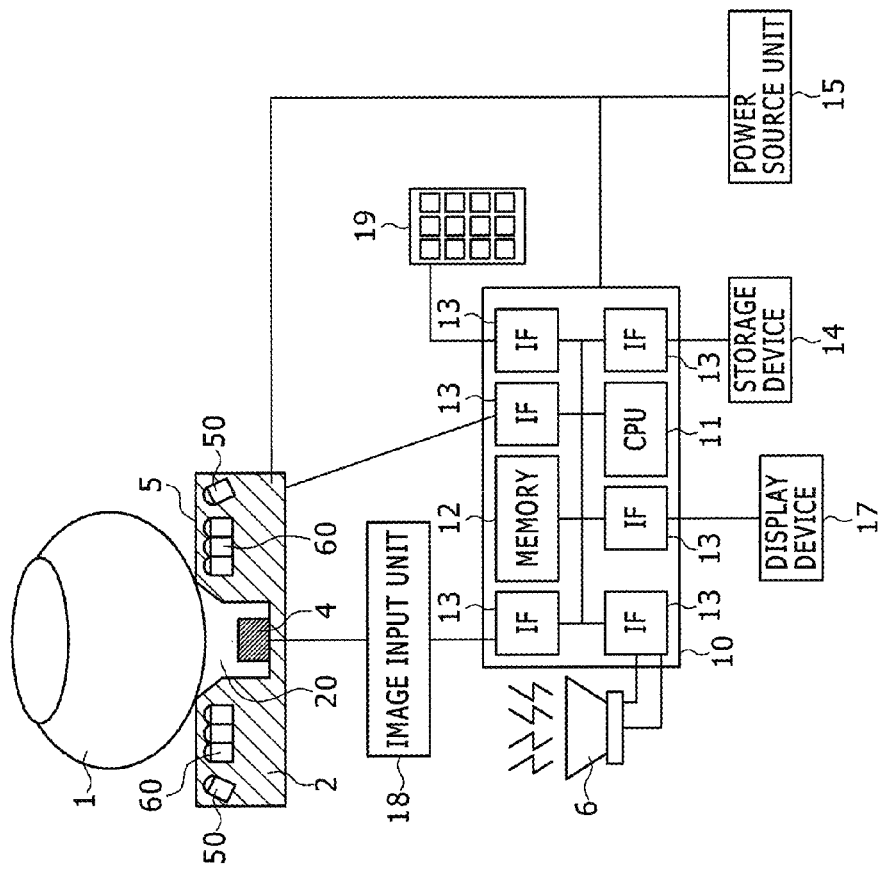

According to the present embodiment, an explanation will be given of an example of a finger vein authentication device including a unit of measuring a contour position of a finger. FIG. 1A is a configuration view of an authentication system of the first embodiment of the present invention. FIG. 1B is a diagram showing inner portions of a memory 12 and a storage device 14 in the authentication system.

The authentication system includes a finger vein data acquiring device 2, an image input unit 18, an authentication processing unit 10, the storage device 14, a display unit 17, an information input unit 19, a voice output unit 6, and a power source unit 15 for acquiring an image necessary for personal authentication.

A cabinet surface of the finger vein data acquiring device 2 is configured with a finger presenting area 7 for presenting a finger for acquiring a blood vessel image, and the finger presenting area 7 is configured by a light source 50 for taking an image of a finger vein, a light source unit 60 for measuring a finger position, an image taking device 4, and a finger placing base 5 for presenting the finger.

Figure 17:
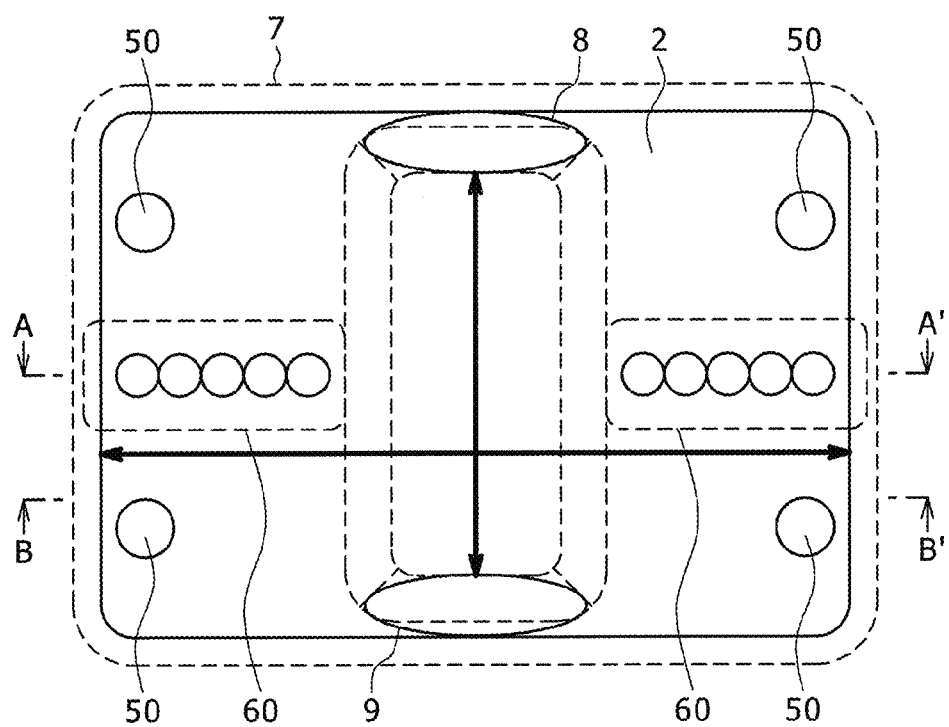
FIG. 17 is an explanatory view of a configuration of a finger vein authentication system.

Portions of the finger presenting area 7 are provided with a tip end presentation area 8 capable of presenting a tip end side of the finger, and a root presentation area 9 capable of presenting a root side of the finger integrally with the finger placing base 5 as shown in FIG. 17. According to the present embodiment, an opening portion 20 is configured to have a stepped difference relative to a cabinet plane in order to avoid contact with the finger. However, the opening portion 20, the tip end presentation area 8, the root presentation area 9, and the finger placing base 5 may integrally be configured as one flat face by eliminating the stepped difference of the opening portion 20.

The light source 50 is, for example, an infrared ray emitting diode (Light Emitting Diode: LED), and irradiates a finger 1 presented on the finger presenting area 7 configured at the finger placing base 5 with an infrared ray. The light source unit 60 is configured by a single piece or plural pieces of a light source(s). For example, an infrared ray emitting diode is used as the light source. In a case of using the device by being integrated to a terminal incorporated in a liquid crystal screen of a portable telephone or the like, light outputted from above the liquid crystal screen may be used as the light source. The image taking device 4 takes an image of a finger 1 presented.

The image input unit 18 inputs the image taken by the image taking device 4 to the authentication processing unit 10 which functions as a processing unit. Incidentally, the image input unit 18 may be configured to execute a processing of extracting a blood vessel pattern image from the image taken by the image taking device 4 and inputting the extracted blood vessel pattern image to the authentication processing unit 10.

The image input unit 18 and the finger vein data acquiring device 2 may naturally be integrated to configure as a blood vessel image extracting device, and the image input device 18 may naturally be configured to be integrated with the authentication processing unit 10.

The authentication processing unit 10 includes a central processing unit (CPU) 11, the memory 12, and various interfaces (IF) 13. CPU 11 executes various processings by executing a program 100 stored to the memory 12. The memory 12 temporarily stores the authentication program 100 executed by CPU. The memory 12 stores an image inputted from the image input unit 18. The interfaces 13 are connected to devices at outside of the authentication processing unit 10. Specifically, the interfaces 13 are connected to the finger vein data acquiring device 2, the storage device 14, the display unit 17, the information input unit 19, the voice output unit 6, the image input unit 18, and the like.

The storage device 14 is previously stored with a registration data 30 of a user and the program 100. The registration data 30 is information for checking a user, and is, for example, an image of a finger vein pattern or the like. The image of the finger vein pattern is an image of a blood vessel (finger vein) distributed below the skin of the palm side of the finger taken as a dark shadow pattern.

The display unit 17 is, for example, a liquid crystal display or the like, and displays information received from the authentication processing unit 10. The information input unit 19 is, for example, a keyboard or the like, and transmits information inputted from the user to the authentication processing unit 10. The voice output unit 6 is a speaker or the like, and emits information received from the authentication processing unit 10 by voice. The power source unit 15 is a dry cell or an external power source, and supplies a power for driving the finger vein data acquiring device 2 and the authentication processing unit 10.

According to the present authentication system, when a user presents the finger 1 to the finger vein data acquiring device 2, light is irradiated from the light source unit 60 for measuring a finger position, and an image is taken at the image taking unit 4. The taken image is inputted to inside of the authentication processing unit 10, and the authentication processing unit calculates a position of presenting the finger 1 based on the inputted image.

When the finger position measurement is finished, the light source 50 for taking an image of a vein is switched on, and the image of the inner finger is taken. The light source 50 irradiates the finger 1 with light. The irradiated light is scattered at the inner portion of the finger 1, and light transmitted through the finger 1 is incident on the image taking unit 4. The incident light is converted into an electric signal by the image taking unit 4, and inputted to the authentication processing unit 10 as an image. The inputted image is stored to the memory 12.

Next, the registration data 30 and the program 100 preserved in the storage device 14 are stored to the memory 12 by the storage device 14 (FIG. 1B). CPU 11 configures an authentication data 40 from the inputted image and checks the authentication data 40 with the registration data 30 in accordance with the program 100 stored to the memory 12.

In the checking processing, a positional shift between the registration data and the authentication data is corrected based on a result of the finger presenting position calculated at the authentication processing unit 10. Thereafter, a correlation between the registration data and the authentication data is calculated. It is determined whether the authentication data and the registered data coincide with each other in accordance with a calculated value of the correlation. A person is authenticated by using the determination result. The authentication result is displayed on the display unit 17, or notified by voice from the voice output unit 6.

Figure 2A:
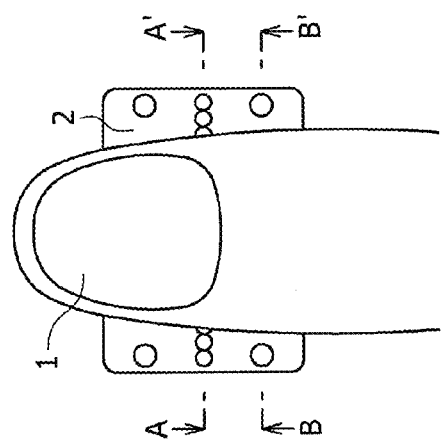
FIGS. 2A, 2B, 2C, and 2D show an example of a shape of a finger vein data acquiring device.
Figure 2B:
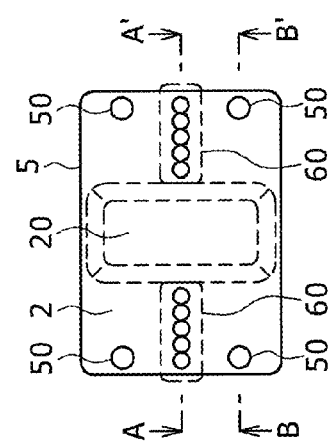
Figure 2C:
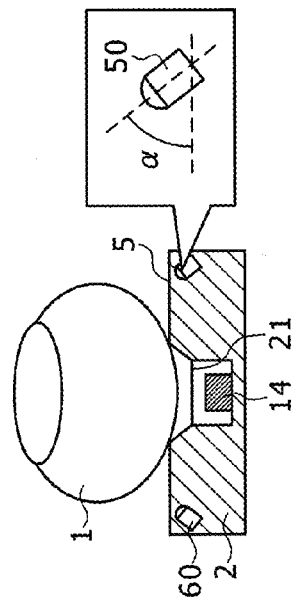
Figure 2D:
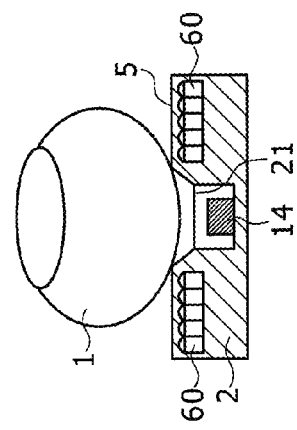

FIGS. 2A, 2B, 2C and 2D are views showing an outlook of the finger vein data acquiring device 2 according to the first embodiment. FIG. 2A is a top face view of the finger vein data acquiring device 2, FIG. 2B is a top face view when a finger is presented to the device 2, FIG. 2C is a sectional view taken along a line A-A' of FIG. 2B, and FIG. 2D is a sectional view taken along a line B-B' of FIG. 2B.

A top face of the finger vein data acquiring device 2 is provided with the finger placing base 5 for a user to present a finger of an authentication object. The opening portion 20 is provided at a center of the finger placing base 5. The opening portion 20 may be installed with an infrared ray transmitting filter 21 to cover the opening portion 20. Unnecessary light other than the infrared ray can be prevented from approaching inside of the device by providing the infrared ray transmitting filter. Also, a foreign matter of dust or dirt can be prevented from entering the inside of the device. The filter 21 may be installed at a position lower than the finger placing base 5 by about several millimeters to thereby prevent the finger 1 and the filter 21 from being brought into contact with each other. Thereby, a vein pattern can be prevented from being vanished or deformed by pressing the finger to the filter 21. Also, a stain can be prevented from adhering to the filter 21.

The light sources 50 for taking an image of the finger vein are installed at a surrounding of the opening portion. The image taking unit 4 is installed directly below the opening portion 20. When the finger 1 is presented, the light sources 50 each configured by a single or plural light source element(s) irradiate the finger 1 with infrared rays. When the infrared rays reach inside of the finger, the rays are scattered in all the directions. Portions of the rays scattered at inside of the finger reach a vicinity of an upper side of the opening portion 20, and portions thereof advance from inside of the finger to outside of the finger. The ray passes through the opening portion 20 and the filter 21, and an image thereof is taken by the image taking unit 4. The ray transmits through a surface on the palm side of the finger 1 from inside of the finger 1. Therefore, there is a contrasting difference between a ray of weak light which is attenuated by passing through a vein part and a ray of strong light which gets away from a part where the vein is not present and is not attenuated. Therefore, when images of the rays are taken, a finger vein pattern image of a partial area which is disposed right above the opening portion 20 is taken in the image. Thereby, the finger vein pattern of the finger 1 is acquired.

The following optical condition needs to be satisfied in order to clearly take the partial area of the finger 1 which is disposed above the opening portion 20, that is, the finger vein pattern of the imaged portion. First, an image of reflected light of light which is irradiated from outside of the finger to a skin surface of the imaged portion is made to be prevented from being taken. That is, an image of scattered light which does not reach a depth where the finger vein is present from outside of the finger is made to be prevented from being taken. In a case where the condition is not satisfied, the light which does not have information of the finger vein pattern reduces a contrast between the finger vein portion and the other living body tissue. Furthermore, an unnecessary image of a wrinkle or the like of the finger surface is clearly imaged, and therefore, the finger vein pattern is made to be difficult to be viewed. Hence, according to the present embodiment, a size of the opening portion 20 is made to be smaller than a width and a length of the finger 1, and when a user presents the finger 1, the opening portion 20 is made to be completely covered by the finger 1. Thereby, light which is not transmitted through the finger can be prevented from directly approaching inside of the device. A distance between a camera and a subject can be shortened by narrowing an image taking range by narrowing the opening portion 20. That is, there is also achieved an effect of thinning the vein data acquiring device 2 by narrowing the opening portion 20.

Positions of installing the light sources 50 for taking an image of the vein are disposed on left and right sides of an area where the finger 1 is presented (long axis direction of finger). When the light sources 50 are provided in four directions of the surrounding of the opening portion 20, light can be irradiated further evenly. In a case where a light quantity of transmitted light taken from the opening portion is intended to increase, the light sources 50 which are diagonally provided may irradiate light to face each other on the side of the opening portion 20.

Heights of installing the light sources 50 are determined such that the heights are the same as a height of the finger placing base 5 or the light sources 50 are disposed at positions lower than the finger placing base 5. Also, an angle α of installing the light source 50 falls in a range of 0 degree<α<90 degrees relative to the finger presenting area 7, and light is irradiated in a skewed upper direction (FIG. 2D).

As described above, the device can be thinned by lowering the position of installing the light source. Also, light can be irradiated to a high position of the finger by installing the light sources 50 in skewedly inclined upper directions on the left and right sides of the finger, and therefore, a clear vein image can be taken. Incidentally, it is preferable to install the light sources on outer sides of a finger width of the finger 1. Thereby, light can be irradiated to an upper half face of the finger 1, that is, the back side of the finger. When the light source is installed on the inner side of the finger width, light is irradiated to a lower other face of the finger 1, that is, the palm side of the finger, and therefore, a visibility of the taken image is lowered.

A touch sensor may be provided at an inner portion of the finger placing base 5. Thereby, it can easily be detected that the finger of the user is presented.

The light source unit 60 for measuring a finger position is installed on both sides of the opening portion. The light source unit 60 is configured by plural pieces of light sources. The plural pieces of the light sources are installed to align in one row in a finger width direction of the finger 1. The light sources in the light source unit 60 are installed to direct right above as shown in FIG. 2C. It is preferable to align the light sources without clearances thereamong over a total of the finger placing base 5 as shown in FIG. 2A. The position of presenting the finger can be measured even in a case where the position of presenting the finger is significantly shifted in a left and right direction by arranging the light sources in a wide range. Also, a position of presenting a thick finger is made to be able to be detected. An effect of improving a resolution of measuring the finger position is achieved by aligning the light sources such that the contiguous light sources are brought into contact with each other without clearances thereamong.

Next, an explanation will be given of an arrangement of the plural light sources configuring the light source unit 60 in reference to FIG. 17.

In a case where a direction of connecting the tip end presentation area 8 and the root presentation area 9 is defined as a vertical direction (presenting axis) as shown by an arrow mark in FIG. 17, the plural light sources configuring the light source unit 60 are arranged in a horizontal row in a horizontal direction. In other words with the presented finger 1 as a reference, there is constructed a configuration in which the plural light sources are arranged in a short direction relative to a long direction of the finger.

Although the horizontal row is preferably orthogonal to the vertical direction (presenting axis), at least the presenting axis in the vertical direction and an axis of arranging the plural light sources or an extended line of the arranging axis may be arranged to intersect with each other in order to achieve the effect of the present invention.

The plural light sources are configured respectively as a first light source portion and a second light source portion on both sides via the opening portion 20 as shown in FIG. 17.

An explanation will be given of an embodiment of a registration processing procedure executed in the program 100 which is executed by CPU 11 in reference to FIG. 5 as follows. In the registration processing, first, a finger presentation detection processing (S101) of determining whether the finger is presented (mounted) on the device (S101) is executed, and a position of the finger is measured by using the light source unit 60 in a case where the finger is presented (S102). Thereafter, a light quantity adjustment processing (S103) for irradiating a pertinent light quantity from the light source 50 is executed. A pattern extraction processing (S108) and a characteristic data configuration processing (S109) are executed after finishing the adjustment of the light quantity. Finally, the characteristic data is preserved in the storage device 14, and the registration processing is finished. In other words, CPU 11 is a processing unit which functions not only as a unit of extracting the characteristic and a unit of checking the characteristic but also as a unit of controlling the light quantity and a unit of measuring the position of the finger. Details of the registration flow will be described as follows.

First, an explanation will be given of the finger presentation detection processing (S101). The finger presentation detection processing is a processing of determining whether the finger is mounted on the device 2. As a determining method, a method of using a touch sensor installed at an inner portion of the finger placing base 5, a method by an image processing, a method combining the touch sensor and the image processing or the like can be used.

A description will be given here of an example of a method by an image processing. The method by the image processing achieves an advantage of capable of reducing cost by reducing a number of pieces of parts since a sensor exclusive for detecting the finger is dispensed with. First, the light source 50 described above which is used as an illumination of taking an image of a finger vein pattern is winked at a constant period. In a case where the finger 1 is not presented on the finger placing base 5, even when the light source 50 is switched on or switched off, light emitted from the light source 50 is not imaged to the image taking unit 4 since there is not a body which scatters the light. Therefore, in a case where images of the image taking unit 4 in a state of switching on the light source 50 and in a case of switching off the light source 50 are compared, luminance values thereof are not changed considerably.

On the other hand, in a case where the finger 1 is presented on the device, light irradiated from the light source 50 is scattered by the finger 1 and is imaged to the image taking unit 4. Therefore, a significant change is brought about between the luminance values of the images in the state of switching on the light source 50 and in the state of switching off the light source 50. Hence, the presentation of the finger can be detected by transmitting a change amount of the images taken in switching on and in switching off the light source 50, and calculating and preserving the change amount at CPU 11.

When the presentation of the finger is detected, a processing of measuring a position of presenting the finger is executed. An explanation will be given of a principle of measuring the position of presenting the finger in reference to FIGS. 3A, 3B, 3C, and 3D and FIGS. 4A and 4B as follows.

Figure 3A:
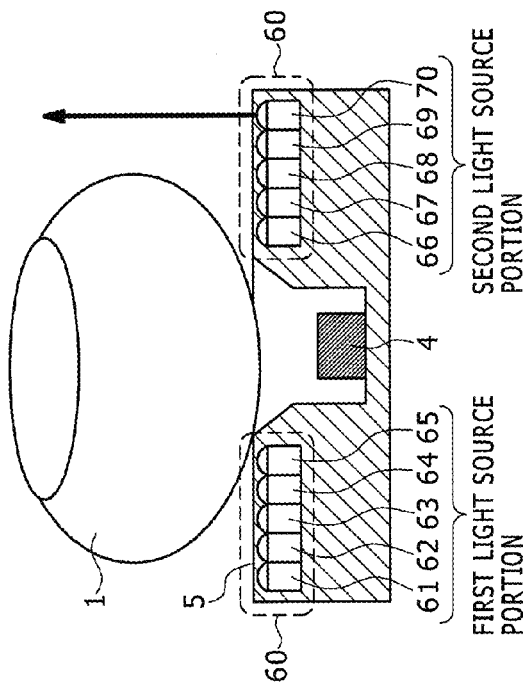

As described above, the vein data acquiring device 2 is arranged with the light source unit 60 for measuring the finger position. The light source unit 60 is configured from plural pieces of light sources 61 through 70. As shown in FIG. 3A, the light sources 61 through 70 are arranged to align in one row at equal intervals below the finger placing base 5. The light sources 61 through 70 are installed in a direction orthogonal to a top face of the finger placing base 5.

Figure 3C:
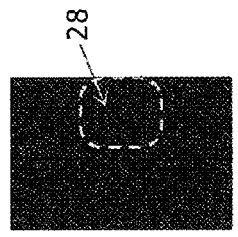
Figure 3B:
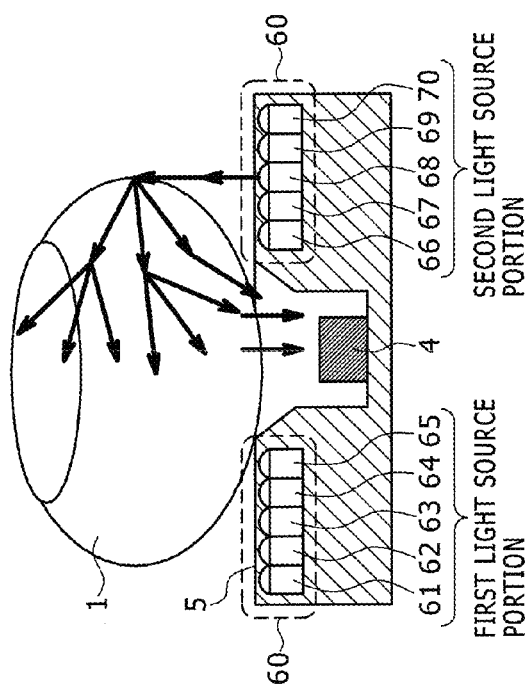

FIG. 3A is a view showing a route of light when the light source 68 disposed directly below the finger 1 is switched on among the light sources included in the light source unit 60. FIG. 3B is a view showing a route of light when the light source 70 installed on the outer side of the contour of the finger 1 is switched on.

Figure 3D:
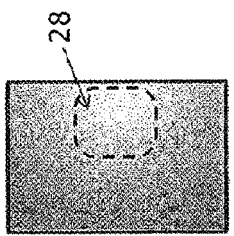

As shown in FIG. 3A, when the light source 68 is switched on in a state of placing the finger 1 on the finger placing base, light is irradiated to the finger 1. When the light irradiated to the finger 1 reaches an inner portion of the finger 1, the light is scattered in all the directions. A portion of the scattered light passes through the opening portion 20, and an image thereof is taken by the image taking unit 4. FIG. 3C shows an example of the image taken by the image taking unit 4. Since the light from the light source 68 reaches the image taking unit 4 via the finger 1, the luminance value of the taken image shows a value higher than the luminance value of an image when the finger 1 is not placed on the finger placing base 5. On the other hand, in a case of switching on the light source 70, since the finger 1 is not present above the light source 70, the light is not impinged on the finger 1 (FIG. 3B). Therefore, the light emitted by the light source 70 is not imaged to the image taking unit 4. An image which is taken when the light source 70 is switched on becomes an image having a low luminance as shown in FIG. 3D. Therefore, it can be determined whether the finger is presented above the respective light sources by successively switching on the light source 61 through the light source 70 and confirming luminance of images taken by the image taking unit 4, and also a contour position of the finger can be detected.

An explanation will be given of a method of specifying a contour position of a finger further in details in reference to FIGS. 4A and 4B. FIG. 4A is a sectional view of the vein data acquiring device 2. FIG. 4B is a graph showing a relationship between luminance values of images taken by switching on the light source 61 through the light source 70 and positions of the light source 61 through the light source 70 in a state where the finger 1 is presented as shown in FIG. 4A. The abscissa designates the position of the light source and the ordinate designates the luminance value of the light source. Incidentally, in FIGS. 4A and 4B, positions of installing the light source 61, the light source 62 ..., the light source 70 for measuring the finger position are respectively indicated by notations $x_1, x_2 \ldots, x_{10}$. The respective light sources are used for determining a contour position of the finger, that is, for detecting a position of the finger arranged on the finger placing base 5, and therefore, optical axes of the respective light sources are arranged not to intersect each other at least in a presentation space where the finger is presented (space where the finger 1 shown in the respective figures is presented), although details thereof will be described later. It is preferable to arrange the optical axes of the light sources to direct in a direction vertical to a plane of the finger placing base 5 in order to arrange the optical axes more strictly.

Also, irradiation axes of the respective light sources may be arranged to be inclined to the plane of the finger placing base 5 on a side opposed to a side of arranging the opening portion 20. In other words, the irradiation axes of the respective light sources are arranged such that the value of the angle α explained in reference to FIG. 2D falls in the range of 90 degrees<α<180 degrees. A space of arranging the light sources can be narrowed by the configuration while ensuring a region of detecting the position of presenting the finger equivalent to that when the optical axes of the respective light sources are arranged vertically by the configuration. Therefore, the device can further be thinned and downsized.

When the graph of FIG. 4B is viewed, it is known that the luminance value of the taken image becomes high when the light sources 62 through the light sources 68 are switched on, and the luminance value of the taken image becomes low when the light source 61, the light source 69, and the light source 70 are switched on. It can be determined therefrom that the finger 1 is presented at positions of installing the light source 62 through the light source 68, that is, within a range of from $x_2$ to $x_8$. At this occasion, the finger contour position can be determined by detecting that left and right contours of the finger are respectively disposed at positions of $x_2$ and $x_8$ where distances from the finger are the remotest.

Concerning a method of determining the contour position of the finger, a threshold for determining presence/absence of the finger may be provided at the luminance value as shown in FIG. 4B, or a threshold may be provided to a change rate of luminance values of front and rear light sources, for example, in a case of $x_2$, a change rate of the luminance values of $x_1$ and $x_3$.

Although an explanation will be given of a configuration in which the light source unit 60 is arranged on both sides of the opening portion 20, the light source unit 60 may be arranged only on one side of the opening portion as will be described later in details in a fifth embodiment. For example, only the light sources 61 through 65 of the light source unit 60 are arranged, and a mark of a partitioning or the like for positioning the finger is arranged at a prescribed position on the side of arranging the light sources 66 through 70.

The contour position of the presented finger can be specified by measuring the luminance value and the position of the light source when the light source is switched on as described above.

According to the present invention, attention is paid to the luminance value of the image for specifying the position of the finger 1. Here, as the luminance value, an average luminance value of a total of the taken image may be viewed, or an average luminance value of a partial area as shown in an area 28 surrounded by a broken line of FIG. 3C may be utilized.

Here, an image area a luminance of which is significantly changed by light from the light source may be used as an area of calculating an average luminance in order to carry out authentication with a higher accuracy at a higher speed.

For example, an image area at a vicinity of the area 28 in FIGS. 3C and 3D is an area of taking an image of a part which is nearer to the light source, and therefore, a change in a luminance is significant. A luminance of a taken image is high at an area near to the light source 68 (right side area of image), and a luminance of an area remote from the light source 68 (left side area of image) is low as shown in the example of FIG. 3C.

Hence, when an average luminance value of an image of a partial area where a change of the luminance is significant is used as a value for determining the contour position, a determination accuracy can be improved since a change in a luminance by installing the finger is more significant. Also, a determination is carried out by using not a total of an image but an image of the partial area, and therefore, a load of calculating an average luminance value can be alleviated, and the determination can be carried out at a higher speed.

Figure 7:
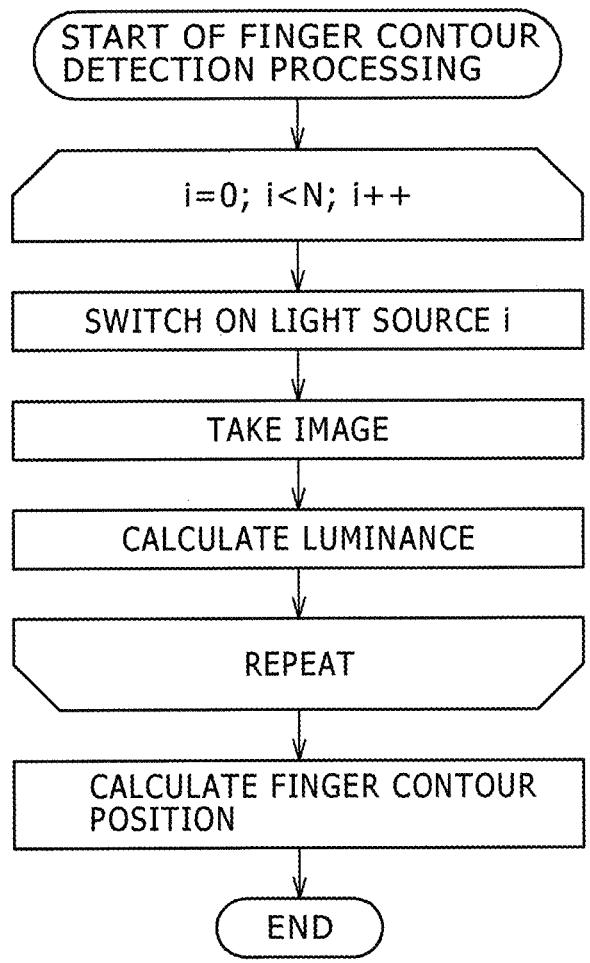
FIG. 7 shows an example of a flowchart of a finger position detection processing.

FIG. 7 shows an example of a flowchart of a finger position detection processing (S102). When the contour position of the finger is detected, first, one light source of the light sources included in the light source unit 60 is switched on (S1021). An image when the light source i is switched on is taken (S1023), and an average luminance of a total image or a portion of an image area desired is calculated (S1025). A flow of S1021, S1023, and S1025 is repeated while changing the light sources to be switched on.

All the light sources included in the light source unit 60 are switched on while changing timings, and luminance values in correspondence with the respective light sources are acquired. It is determined whether the finger is disposed above the corresponding light source by confirming whether the acquired luminance values exceed a threshold that is determined beforehand. The contour position of the finger is calculated from an obtained result (S1027).

It is preferable to irradiate light by switching on the light sources successively from a side of the light source having a long distance from the opening portion 20 to a side of the light source having a short distance therefrom to irradiated light, or switching on the light sources successively from the light source on a side near to the opening portion 20 to the light source on a side remote therefrom to irradiate light as an order of switching on the light sources. Explaining by an example of the light sources 61 through 65 of the light source unit 60, the light sources are switched on in an order of the light sources 61, 62, 63, 64, and 65, or conversely switching on the light sources in an order of the light sources 65, 64, 63, 62, and 61. The contour position of the finger can be detected at a higher speed by successively switching on the light sources from the side of the light source having the long distance from the opening portion 20 since an area of the finger presenting area 7 occupied by the finger is enlarged in view of downsizing a total of the device.

When the method of switching on the light sources and a calculation of the luminance values of the images based on the respective light sources or change rates of the luminance values among the respective images are carried out in parallel with each other, presence/absence of the finger and the contour position of the finger can be determined at a stage at which the luminance value or the change rate exceeds the threshold without acquiring all the images by switching on all the light sources. The contour position can be specified at a higher speed and power consumption by the light sources can be alleviated by the method.

In a case of determining presence/absence or the contour position of the finger at a higher speed, the respective light source portions on both left and right sides arranged via the opening portion 20 may successively be switched on in parallel with each other.

An explanation will be given by defining the light sources 61 through 65 as a first light source portion and defining the light sources 66 through 70 as a second light source portion for explaining the method of switching the light sources.

First, the image taken by the image taking unit 4 is divided into two of a first image area taking an image of the finger on a side near to the first light source portion, and a second image area of taking an image of the finger on a side near to the second light source portion.

Next, a luminance value of the first image area is regarded as the luminance value caused by the light sources of the first light source portion. The luminance values of the first image area when the light sources 61 through 65 are switched on are calculated, and presence/absence of the finger and the contour position are determined by the method described above. Similarly, the luminance value of the second image area is regarded as the luminance value caused by the light sources of the second light source portion, and a similar determination is carried out.

The determination of presence/absence of the finger or the contour position can be executed at a higher speed by separately controlling the light source portions on the both left and right sides in parallel with each other and also processing an operation of the image processing separately in this way.

In the processing flow S1021, it is preferable to switch on all the light sources with the same brightness. Because when the brightness differs for the respective light sources, it cannot be differentiated whether the luminance is lowered since light is not incident on the finger, or whether the luminance is lowered since a light emitting amount of the light source is low. However, in a case of utilizing LED as a light source, there is a case where light is emitted by a different brightness even when the same current is made to flow to LED by an individual difference of LED. Hence, it is preferable to investigate a dispersion of all of LED's and determining flowing amounts of currents for respective LED's such that light can be emitted with the same brightness in all of LED's.

When the finger presenting position measurement processing (S102) is finished, light for illumination of taking an image of the vein is outputted from the light source 50. A light quantity necessary for taking an image of the vein differs by a thickness of the finger presented or a thickness of the skin. Hence, a light quantity of the vein image taking light source 50 is adjusted such that the clearest image is obtained (S103). In taking an image of the finger vein, the clear image of the vein can be obtained in a case where an average luminance value of the taken image becomes a value at a vicinity of a center of luminance gradation. For example, when the average luminance of the image is excessively low, the image is not clear since a contrast between the blood vessel and the other portion is poor. Conversely, when the average luminance is excessively high, the blood vessel pattern cannot be extracted since a saturated portion is brought about. That is, in the light quantity adjustment processing (S103), the center value of the luminance gradation is made to be a target luminance value, and the light quantity is adjusted such that the average luminance value of the taken image is near to the target value. As the light quantity adjusting method, according to the present embodiment, there is used a method of always monitoring the average luminance value of the image, and making the average luminance value near to the target luminance value by controlling to feed back the light quantity in accordance with the value.

Figure 15:
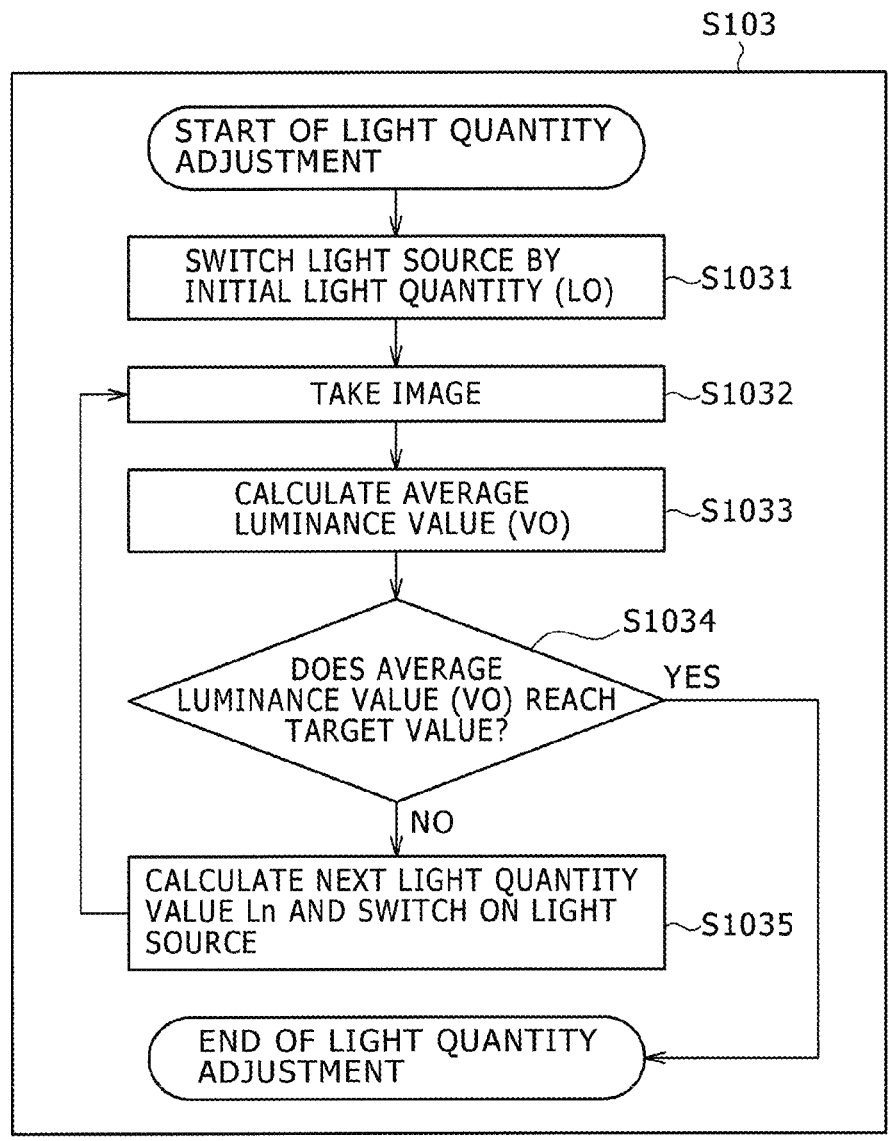
FIG. 15 shows an example of a flowchart of a light quantity adjustment processing.

FIG. 15 shows an example of a flowchart of the light quantity adjustment processing (S103). In the light quantity adjustment processing, first, the light source 50 is switched on by a previously set initial light quantity value L0 (S1031). Concerning the initial light quantity L0, a light quantity value by which an image of a target luminance value can be taken when a standard finger is placed is previously measured, and the value is set. Next, an image is taken by the image taking unit 4 (S1032). An average luminance value V0 of the image is calculated (S1033). It is determined whether the calculated average luminance value V0 is a target luminance value (S1034). In a case where the target luminance value is not reached, a next light quantity value Ln is reset, and the light source 50 is switched on (S1035). Calculation of the next light quantity value Ln is carried out by using a characteristic that the light quantity value and the average luminance value of the taken image are brought into a proportional relationship. After resetting the light quantity value, the image taking (S1032), the average luminance calculation (S1033), and the average luminance value determination (S1034) are carried out again. The flow is repeated, and the average luminance value is made to be near to the target luminance value. In a case where the target luminance value is reached by the average luminance value determination of S1034, the light quantity adjustment is finished. Incidentally, in order to control the light quantity of the light source 50, a power supplied to the light source unit 60 may be controlled. As a method of controlling the power, for example, a switching control at a high speed of PWM (Pulse Width Modulation) or the like using a power transistor can be utilized.

Next, a processing of extracting a blood vessel pattern is executed (S108). The processing of extracting the blood vessel pattern (S108) is a processing of detecting a blood vessel pattern portion by excluding information unnecessary for authentication (noise, wrinkle or the like) from an image taken by the image taking unit 4. As a method of extracting the blood vessel pattern, a method of using an edge enhancement filter highlighting a line segment or a matched filter, a method of extracting a line pattern by tracking a line component, a method of extracting a local cavity position of a luminance value in a section profile of the image or the like can be used.

Thereafter, a characteristic data is configured from the extracted result (S109). As a method of configuring the characteristic data, a method of configuring a characteristic amount by the image per se of the characteristic extraction processing result, a method of detecting a branch point or an end point or the like can be used. In a case of configuring the characteristic amount by the image per se, a contraction processing may be applied to the image after extracting the characteristic for reducing a data size. In a case of utilizing a shape of the extracted blood vessel pattern as the characteristic data, the pattern after extraction may be configured by a narrow line, and widths of all the blood vessels may evenly be made to be the same width, or the characteristic data may be configured in a state where information of the blood vessel width remains without changing the blood vessel width. In a case of configuring the blood vessel width by a narrow line, a pattern of a blood vessel width the same as that in the registration can be configured even in a case of contracting or expanding the blood vessel by an environmental change in authentication, and therefore, an authentication device strong at the environmental change can be realized. On the other hand, when the characteristic data is configured while information of the blood vessel width remains without normalizing the blood vessel width, an amount of information for personal identification is increased, and therefore, a highly accurate authentication device which is difficult to accept the other person can be realized. Incidentally, when the authentication is carried out by utilizing the blood vessel width information, there is a possibility of determining the same finger erroneously as the other finger when the blood vessel is contracted. Therefore, a countermeasure of avoiding the possibility may be added. For example, there is a method of configuring an image making a line width of the blood vessel pattern narrow by a constant rate based on an image after a characteristic extracting processing, and including the image in the registration data. In a case of configuring such a registration data, checking is carried out for both of a blood vessel pattern having an ordinary blood vessel width and a blood vessel pattern narrowing the blood vessel width by an image processing in the authentication processing, and the person per se is determined when a rate of coincidence with either of the blood vessel patterns is high. An authentication strong at a variation in the blood vessel width can be realized by configuring a blood vessel pattern changing a blood vessel width by an image processing and registering the blood vessel pattern as described above. In the processing of preserving the registration data (S110), the characteristic data configured by the characteristic data configuration processing (S109) and information concerning a position of presenting a finger calculated at the finger position measurement processing (S102) are preserved in the storage device 14. As the finger position information, a contour position on the right side of the finger and a contour position on the left side of the finger may be preserved. Or, a center position of the finger calculated based on the contour position information may be preserved. Also, the characteristic data may be subjected to an encryption processing before preserving the characteristic data.

An explanation will be given of an embodiment of an authentication processing procedure executed in the program 100 in reference to FIG. 6 as follows.

In an authentication processing, a finger presentation detection processing (S101), a finger position measurement processing (S102), a light quantity adjustment processing (S103), a pattern extraction processing (S108), and a characteristic data configuration processing (S109) are executed. Thereafter, a processing of checking with a characteristic data registered beforehand (S112) is executed, and it is determined whether a finger of an authentication object is a registered finger.

In the processing procedure of the authentication processing, five processings of the finger presentation detection processing (S101), the finger position measurement processing (S102), the light quantity adjustment processing (S103), the pattern extraction processing (S108), and the characteristic data configuration processing (S109) use a method similar to that of the registration processing. A description will be given of a checking processing (S112) as follows.

In the checking processing (S112), the characteristic data configured in the characteristic data configuration processing (S109) in the authentication processing, and a characteristic data configured and preserved in the registration are compared to check. In a case of configuring the characteristic data by the image per se, a rate of coincidence is calculated by overlapping images and comparing pixel values. In a case of configuring a characteristic data by a branch point or an end point, a rate of coincidence is calculated by comparing pieces of information of numbers of pieces thereof, angles, relative distances and the like of branch lines. It is determined whether a finger is the same finger or the other finger by using the rate of coincidence obtained here. An authentication threshold for a determination can statistically be calculated beforehand. In a case of a rate of coincidence higher than the authentication threshold, a registered person is determined, and in a case where the rate of coincidence is lower than the authentication threshold, the authentication is rejected by regarding that a finger which is not registered is presented.

In the case of calculating the rate of coincidence by the checking processing (S112), when a position of presenting a finger in registration and a position of presenting the finger in authentication are shifted, a position of a vein pattern in a taken image is shifted, and therefore, the rate of coincidence is lowered even when the finger remains the same, and there is a case where the finger is erroneously determined to be the other finger. It is important to calculate an amount of shifting positions in registration and in authentication and correct the positions in order to prevent such an erroneous determination. Hence, the amount of shifting the position is calculated by comparing information of the position of presenting the finger preserved in the registration processing, and information of the position of presenting the finger calculated in the finger position measurement processing (S102) in the authentication processing. The position of the characteristic data in the authentication is corrected in accordance with the calculated position shifting amount. Thereby, the highly accurate authentication can be carried out even in a case of shifting the positions of presenting the finger in the registration and in the authentication. Incidentally, the position shifting correction may be executed for the characteristic data as described above, or may be executed for an input image before the pattern extraction processing.

Figure 18:
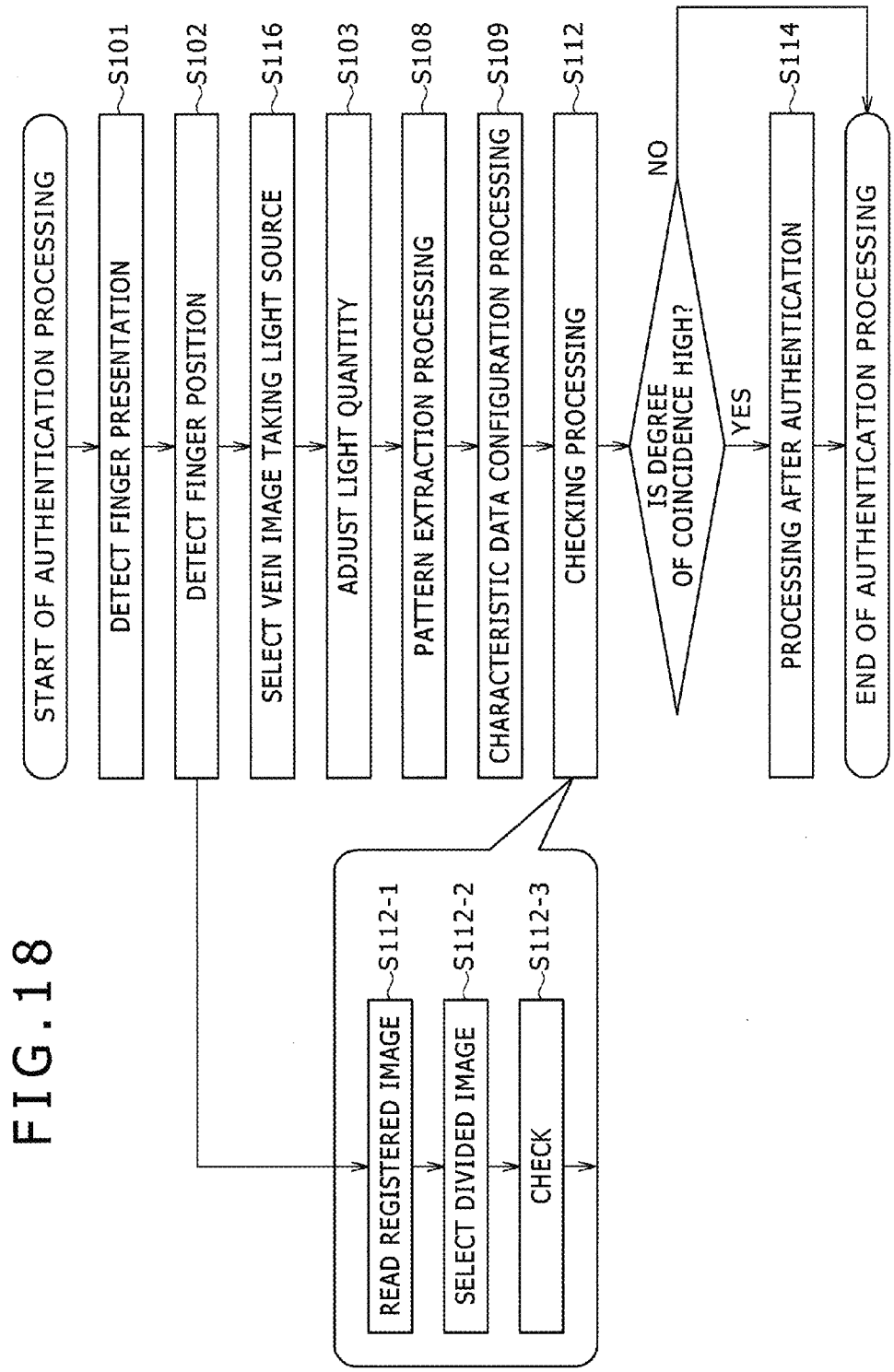
FIG. 18 shows an example of a flowchart of an authentication processing.

An explanation will be given of a processing method which is different from that of the checking processing (S112) described above in reference to FIG. 18.

First, according to the method, as an image area of a registration data, the image area wider than an image taken in the authentication processing (for example, an image of a total of the finger also including a contour of the finger) is acquired. Also, the image area of the registration data is preserved by being divided into plural image areas, and each divided image is corresponded to an image taken at each presentation position of the finger presentation area of a cabinet. Incidentally, the divided image may previously be preserved, or the divided image may be configured when the registered image is read in the authentication processing. As a method of configuring a registration data of a wide image area, there is a method of configuring the vein image taking device 2 exclusive for registration in which a size of the opening portion 20 is changed to be large and taking an image of a data in the registration by the registration exclusive device 2. Taking the image of the registration data is a processing which is carried out only once when the authentication device is used for the first time, and therefore, even when the size of the vein image taking device 2 exclusive for registration is large, an availability of a user is not deteriorated. As other method of configuring the registration data which takes the image of the wide area, there is a method of making a user present a finger by plural times in the registration processing, and preserving position information calculated at the finger position detection processing (S102) and the characteristic data configured at the characteristic data configuration processing (S109) in correspondence with each other. Plural sheets of images having different image taking area positions can be taken by taking the image of the finger at plural times while replacing the finger of the user. Therefore, a group of registration data in which the divided images and the positions of presenting the finger are corresponded can be constructed as described above.

In a case of determining a registered person, for example, a release of a lock or the like is carried out as a processing after authentication (S114).

Second Embodiment

Although according to the first embodiment, the explanation has been given of the method of correcting the positional shift in a left and right direction of the finger by the user when the finger is presented on the finger placing base 5, according to the present embodiment, an explanation will be given of an example of a finger vein authentication system which can not only correct the positional shift in the left and right direction but correct a rotation of the finger.

Figure 8A:
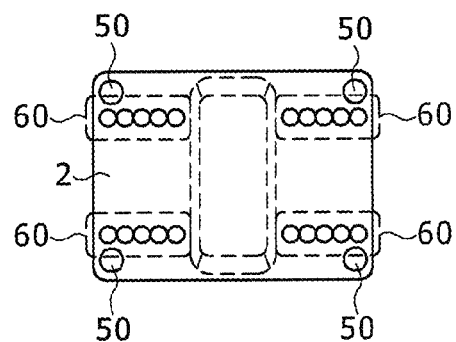
FIGS. 8A, 8B, and 8C show an example of a shape of a finger vein data acquiring device.
Figure 8B:
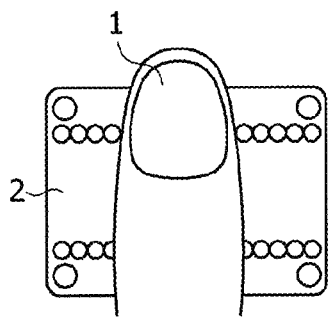
Figure 8C:
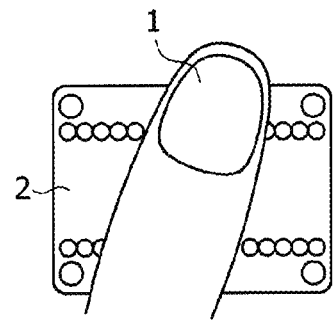

FIGS. 8A, 8B, and 8C show an example of configuration views showing the vein data acquiring device 2 according to the second embodiment. An explanation will be omitted of portions of the finger vein authentication system of FIGS. 1A and 1B and the vein data acquiring device 2 of FIGS. 2A, 2B, 2C, and 2D having functions the same as those of configurations attached with the same notations shown in FIG. 1A through FIG. 7 which have been explained already.

FIG. 8A is a top face view of the vein data acquiring device 2, FIG. 8B is a top face view of the device 2 and the finger 1 when the finger 1 is presented at an ideal position in an ideal direction, and FIG. 8C is a top face view of the device 2 and the finger 1 when the finger is placed in a rotated state.

According to the present embodiment, the method of arranging the finger position measuring light source unit 60 in which the light sources are aligned in one row in the device 2 of FIGS. 2A, 2B, 2C, and 2D is changed and the single row is expanded to plural rows by vertically aligning the plural rows in a longitudinal direction side of the presented finger 1, or the vertical direction side in the definition of the vertical direction explained in reference to FIG. 17 in the first embodiment. Specifically, single rows of the light sources are arranged on a finger tip side and a finger root side as shown in the device 2 of FIG. 8A. Thereby, a contour position in a left and right direction of the finger tip and a contour position in the left and right direction of the finger root side can be detected. The contour positions of the finger tip and the finger root can be detected, and therefore, a degree of rotating the finger can be known. Therefore, even in a case of skewedly presenting the finger as shown in FIG. 8C, an image the same as that when the finger is correctly placed can be obtained by correcting the rotation by an image processing. Thereby, the highly accurate authentication strong at a variation in the position of presenting finger 1 can be carried out. Incidentally, as the method of correcting the rotation, for example, a rotation correcting method using a contour described in Japanese Unexamined Patent Application Publication No. 2002-083298 can be applied.

Figure 9A:
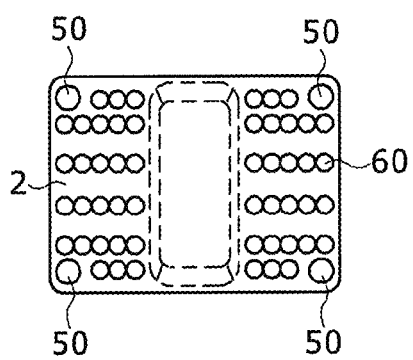
FIGS. 9A, 9B, and 9C show an example of a shape of a finger vein data acquiring device.
Figure 9B:
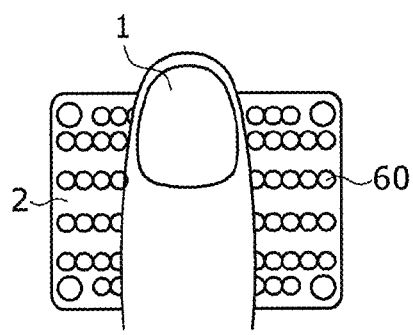
Figure 9C:
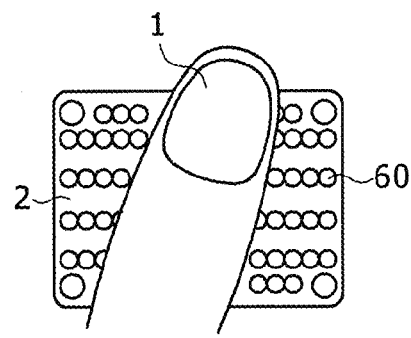

According to the vein data acquiring device 2 of FIGS. 8A, 8B, and 8C, the light source units 60 for measuring the finger position may be aligned in a face-like shape. FIGS. 9A, 9B, and 9C show an example of the device 2 in which the light source units 60 are aligned in the face-like shape. Not only contour positions at the finger tip and the finger root but contour positions at plural portions can be detected by aligning plural pieces of the light sources in the face-like shape, and therefore, information of the position of the finger can further accurately be calculated.

Incidentally, although in FIGS. 9A, 9B, and 9C, the light sources are arranged regularly in a lattice-like shape, when positions of installing the respective light sources are known, an irregular arrangement thereof will do.

Although a blood vessel pattern used in authentication is run in a long axis direction of the finger, and therefore, the positional shift by rotating the finger significantly causes to lower the authentication accuracy, the authentication accuracy can further be improved by correcting the rotation as in the present embodiment.

Third Embodiment

Figure 10:
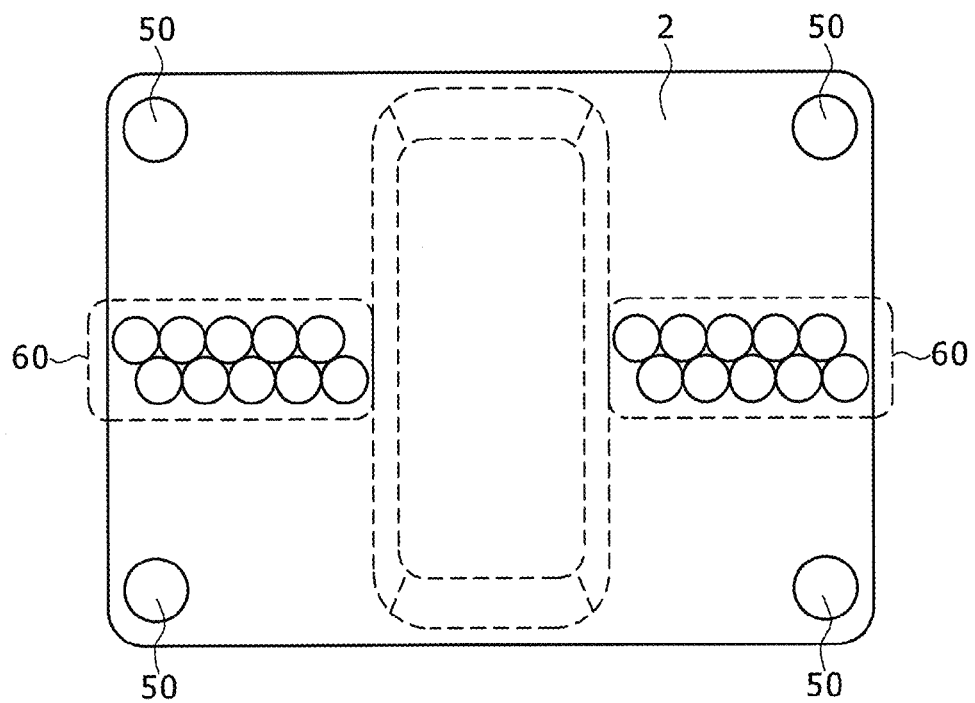
FIG. 10 shows an example of a shape of a finger vein data acquiring device.

In the present embodiment, an explanation will be given of an example of a finger vein authentication system which measures a position of presenting a finger further accurately. FIG. 10 shows an example of a configuration view showing the vein data acquiring device 2 according to the present embodiment.

An explanation will be omitted of portions of the finger vein authentication system of FIGS. 1A and 1B and the vein data acquiring device 2 of FIGS. 2A, 2B, 2C, and 2D having functions the same as those of configurations attached with the same notations shown in FIG. 1A through FIG. 7 which have been explained already.

Distances between contiguous light sources may be shortened when the light source units 60 for measuring the finger position are aligned in order to improve a resolution of measuring the position of presenting the finger 1. However, in a case of aligning the light sources in one row, the light sources cannot be arranged by bringing the light sources close to each other more than sizes of the light sources per se. Hence, the light sources are aligned in two upper and lower rows as shown in FIG. 10. At this occasion, the light sources are installed by shifting center positions of the light sources of the upper row and the lower row. That is, it is configured that center positions of any light sources of the plural light sources of the lower row are aligned between the center positions of the respective contiguous light sources of the upper row. Thereby, the contour position of the finger can further accurately be detected, and therefore, the resolution for measuring the position of presenting the finger can be improved.

Fourth Embodiment

In the embodiment described above, the explanation has been given of an example of determining a finger width or the like by providing the light source unit 60 on both sides of the opening portion 20. However, in a case where a positional shift in presenting the finger is large, and, for example, a contour on one side of the finger is presented right above the opening portion 20, there is a possibility that light from the light source is not irradiated to the finger, or a contour position on the other side of the finger is presented by going across a position of arranging the light source unit 60, thereby, the contour position of the finger cannot be determined.

Figure 11A:
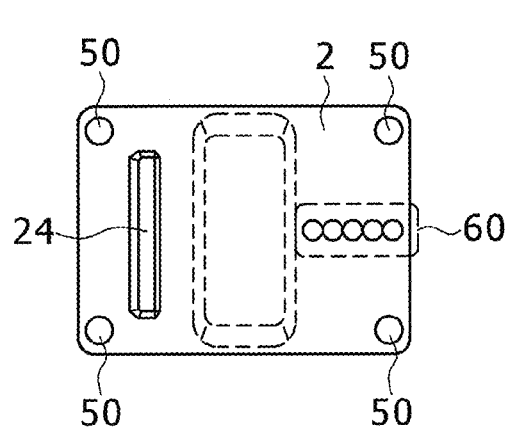
FIGS. 11A and 11B show an example of a shape of a finger vein data acquiring device.
Figure 11B:
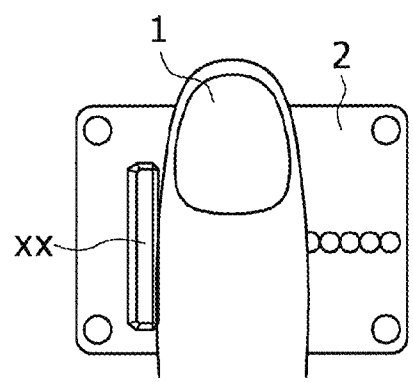

Hence, according to the present embodiment, an explanation will be given of an example of a finger vein authentication system which measures a finger width by determining the contour position of the finger further accurately. FIGS. 11A and 11B show an example of configuration views showing the vein data acquiring device 2 according to the present embodiment.

An explanation will be omitted of portions of the finger vein authentication system of FIGS. 1A and 1B and the vein data acquiring device 2 of FIGS. 2A, 2B, 2C, and 2D having functions the same as those of configurations attached with the same notations shown in FIG. 1A through FIG. 7 which have been explained already.

The light source unit 60 is arranged similar to the first embodiment on the right side of the opening portion. The left side of the opening portion includes a protrusion 24 for determining a position of presenting a side face on the left side of the finger. The protrusion may be configured integrally with a cabinet of the vein data acquiring device 2 such that a portion of the cabinet of the vein data acquiring device 2 is configured by a convex shape. Also, the protrusion may be arranged on either of left and right sides of the finger so far as a side face on one side of the finger can be presented.

A user presents the finger by aligning a position of the protrusion 24 and a position of a side face on one side of the finger, thereby, a contour position on the left side of the finger is determined to the position of the protrusion 24. The device 2 switches on the light source of the light source unit 60 when presentation of the finger 1 of a user is detected. Thereafter, the contour position on the right side of the finger is detected in accordance with flow of FIG. 7. The finger width is made to be able to calculate with a higher accuracy by restraining a reduction in an accuracy of determining the finger contour position owing to a positional shift in presenting the finger by detecting the left and right contour positions of the finger by a procedure described above and calculating a difference between the left and right contour positions.

Fifth Embodiment

According to the fourth embodiment, the explanation has been given of the embodiment in which the contour position of the finger can be determined even in the case where the positional shift of the finger is large, and the finger is not presented above the light source unit 60. However, according to the fourth embodiment, the light source is arranged only on one side of the opening portion 20, and therefore, there is a possibility of lowering the determination accuracy.

Figure 12A:
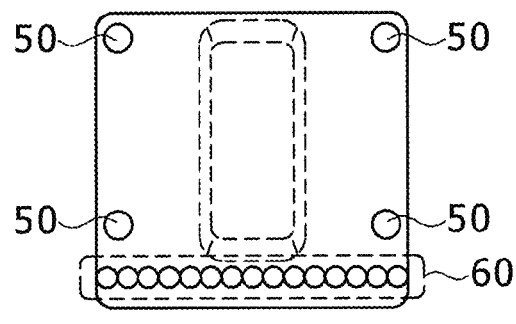
FIGS. 12A and 12B show an example of a shape of a finger vein data acquiring device.
Figure 12B:
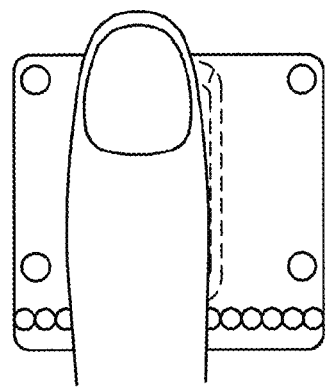

Hence, according to the present embodiment, an explanation will be given of an example of a finger vein authentication system which can detect the position of the finger even when a finger which is narrower than the width of the opening portion 20 is presented, or even when a positional shift is brought about also in the configuration of arranging the light sources on the both sides of the opening portion 20. FIGS. 12A and 12B show an example of configuration views showing the vein data acquiring device 2 according to the fifth embodiment.

FIG. 12A is a top face view of the device 2, and FIG. 2B is a top face view of the vein data acquiring device 2 in a state of placing the finger. The vein data acquiring device 2 of FIGS. 2A, 2B, 2C, and 2D is installed with the light source unit 60 only on left and right sides of the opening portion. Therefore, the contour position of the finger cannot be detected in a case where the finger narrower than the width of the opening portion 20 is presented, or in a case where the finger is positionally shifted considerably in either of left and right sides (FIG. 12B). Hence, according to the present embodiment, the light source unit 60 is arranged on this side of the opening portion, that is, on a side of the root presentation area 9 as shown in FIG. 12A. According to the configuration, the contour position of the finger can be detected even in a case where the contour of the finger 1 is presented directly above the opening portion 20.

Also, an effect of the present invention can be achieved by constructing a configuration where the light source unit 60 is arranged similarly on a side of the tip end presentation area 8. However, in view of the fact that a positional shift in a left and right direction or a positional shift by rotation is liable to be increased on the tip end of the finger more than the root side of the finger, the blood vessel image is made to be able to be taken further accurately by arranging the light source unit 60 on the root side of the finger as in the present embodiment.

Sixth Embodiment

Figure 13A:
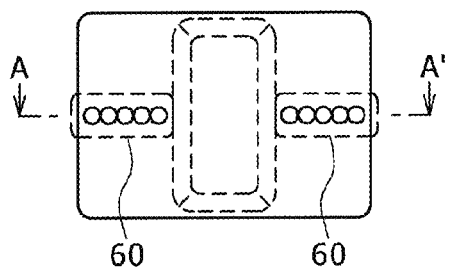
FIGS. 13A, 13B, and 13C show an example of a shape of a finger vein data acquiring device.
Figure 13B:
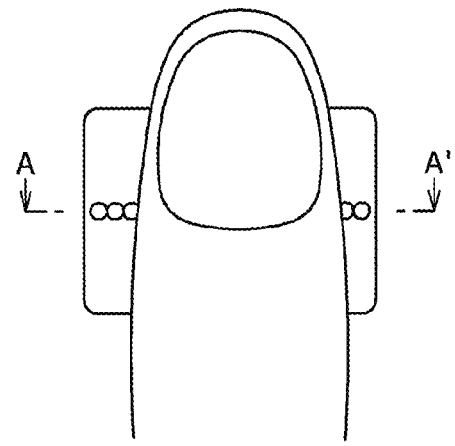
Figure 13C:
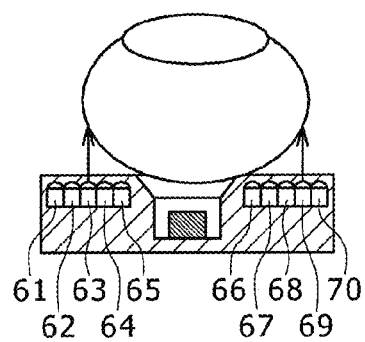

According to the present embodiment, an example of the vein data acquiring device 2 reducing a number of pieces of parts will be shown. FIG. 13A is a top face view of the vein data acquiring device 2 according to the present embodiment. FIG. 13B is a top face view when the finger 1 is placed thereon, and FIG. 13C is a sectional view taken along a line A-A' of FIG. 13A.

The vein data acquiring device 2 is installed with the light source unit 60 for detecting the finger position. The light source unit 60 is utilized also as a light source for taking an image of the vein. Therefore, the vein data acquiring device 2 of the present embodiment is not installed with the vein image taking light source 50.

The production cost can be reduced by the configuration of the present embodiment since it is not necessary to use the light source 50. Also, it is not necessary to switch the light source to be switched on from the light unit 60 to the light source 50, and therefore, the vein image can be taken at a higher speed.

Figure 14:
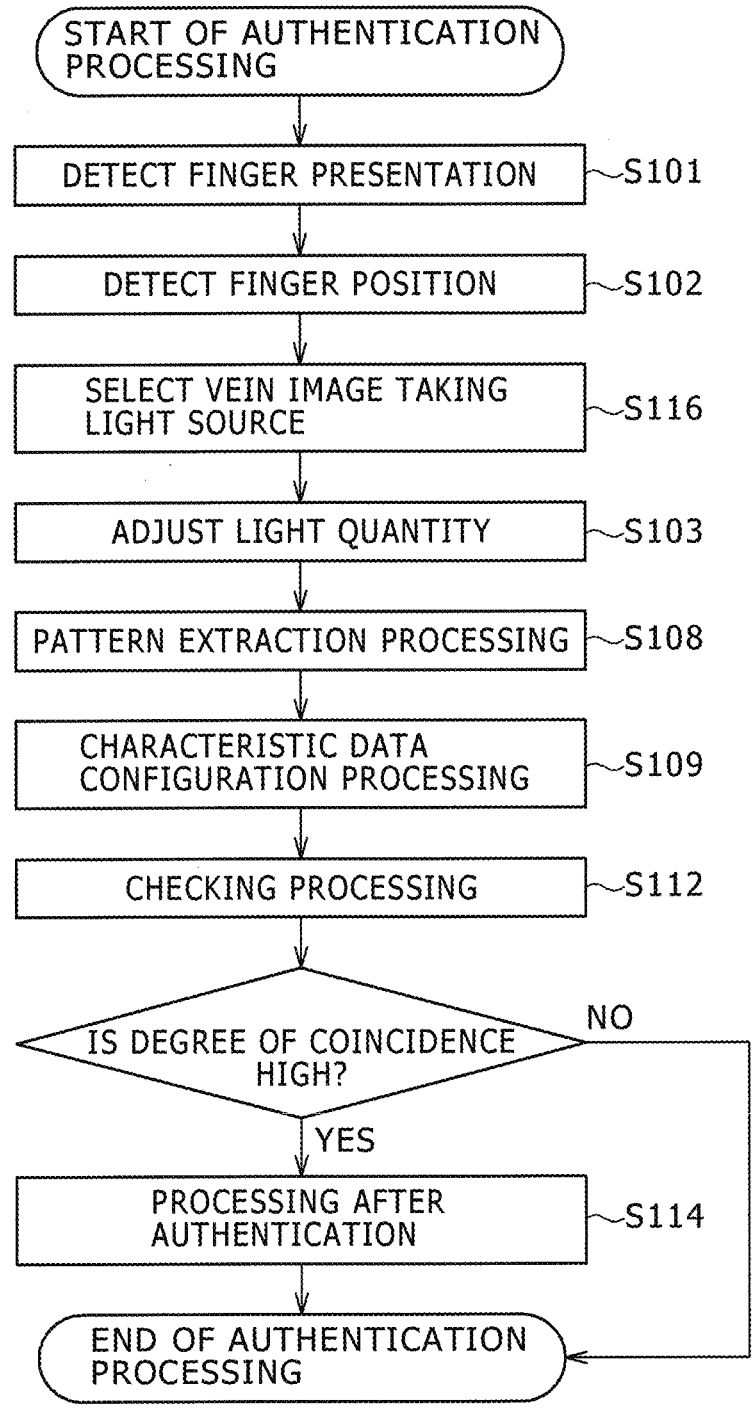
FIG. 14 shows an example of a flowchart of an authentication processing.

An explanation will be given of an authentication flow of the sixth embodiment in reference to FIG. 14. First, presentation of the finger is detected (S101). The detection is realized by using a touch sensor similar to the first embodiment. Next, a position of the finger is measured (S102). A method similar to that of the first embodiment is utilized for measuring the position of the finger. Specifically, the light sources of the light source unit 60 are successively switched on individually, and the contour position of the finger 1 is calculated from a luminance value of an image taken at that occasion. In a case where the finger 1 is placed at a position indicated by FIG. 13C, it is determined that the left side contour of the FIG. 1 is disposed at a position of the light source 63, and the right side contour of the finger 1 is disposed at a position of the light source 69.

After finishing the finger position measurement processing (S102), the light quantity adjustment processing (S103) is executed. In the light quantity adjustment processing, a light source which is installed on a lower side of the contour of the finger 1, in other words, a light source having the longest distance from the opening portion 20 is selected from light sources irradiating the finger with light, and switched on. The light source disposed on the lower side of the contour is selected for taking a clear vein image in a state where a danger of saturating a luminance of an image that is brought about by an excessively large light quantity is the least. In the example of FIG. 3C, the light source 63 and the light source 69 are selected. At this occasion, when a light source on an outer side of the contour of the finger 1 (for example, light source 70 or light source 61) is selected, light emitted from the light source is not impinged on the finger 1, and therefore, a light quantity for taking an image of the vein is deficient. A light source at a position proximate to the opening portion 20 (for example, light source 65 or light source 66) is selected, light from the light source is directly incident on the image taking unit, or light having a large light quantity of light that is reflected by impinging light to a face on the palm side of the finger 1 or the like is incident on the image taking unit, and therefore, it is difficult to obtain a clear vein image by light transmitted through the finger having a small light quantity. It is preferable to recognize the contour position of the finger 1 and select the light source disposed below the contour position in order to obtain a clearer vein image. When the light source which is used for adjusting the light quantity is determined, the light quantity adjustment processing is executed in accordance with the flow of FIG. 15. The pattern extraction processing (S108), the characteristic data configuration processing (S109), and the checking processing (S112) thereafter are executed by a method the same as that of the first embodiment.

When the taken image is within a range in which the image is not influenced by light from a light source proximate to the opening portion 20 as described above, the vein image may be taken by also using light sources which are disposed more proximate to the opening portion 20 than the contour position of the finger, that is, the light sources 64 through 68 of FIG. 13. In this case, as described above in reference to FIGS. 3A, 3B, 3C, and 3D, a luminance value of the taken image is larger in an image area in correspondence with light from the light source that is arranged more proximately to the image taking unit. Therefore, in the present embodiment, a light quantity is controlled such that 69>63=68>64=67>65=66 from a side of a larger light quantity.

An image having less non-uniformity of the luminance can be taken by finely controlling the light quantity from the light source more proximate to the opening portion 20 than the contour position of the finger, that is, the light source which can irradiate the finger with light in consideration of the distance from the image taking unit in this way, and an effect of being liable to extract the clear blood vessel pattern is achieved.

Naturally, the present embodiment has a characteristic of taking an image of transmitted light transmitted through the finger having a light quantity smaller than that of direct light from the light source or reflected light reflected from the finger surface. Therefore, for example, in a case where an influence of luminance saturation or the like is brought about by light of a light source 65 or 67 that is disposed proximate to the finger, the partial light sources may be switched off.

Seventh Embodiment

The present embodiment shows an example of a finger vein authentication system which can measure a height by which the finger 1 is presented.

In a case where the height presented by the finger 1 is changed between that in registration and that in authentication, the size of the finger 1 in the taken image is changed, and therefore, even the same finger may be determined erroneously as the other finger. In order to resolve the problem, it is effective to adopt a method of measuring a position (height) of the finger 1 presented on the authentication device and correcting a magnification rate of the image by the presented position.

Hence, according to the embodiment, an explanation will be given of a method which is utilized for detecting a positional shift in a vertical direction of the finger. Incidentally, the present embodiment may be used by itself, or may be used in combination with the positional shift detecting methods in the left and right direction and in the rotational direction of the finger according to the embodiments described above.

Figure 16:
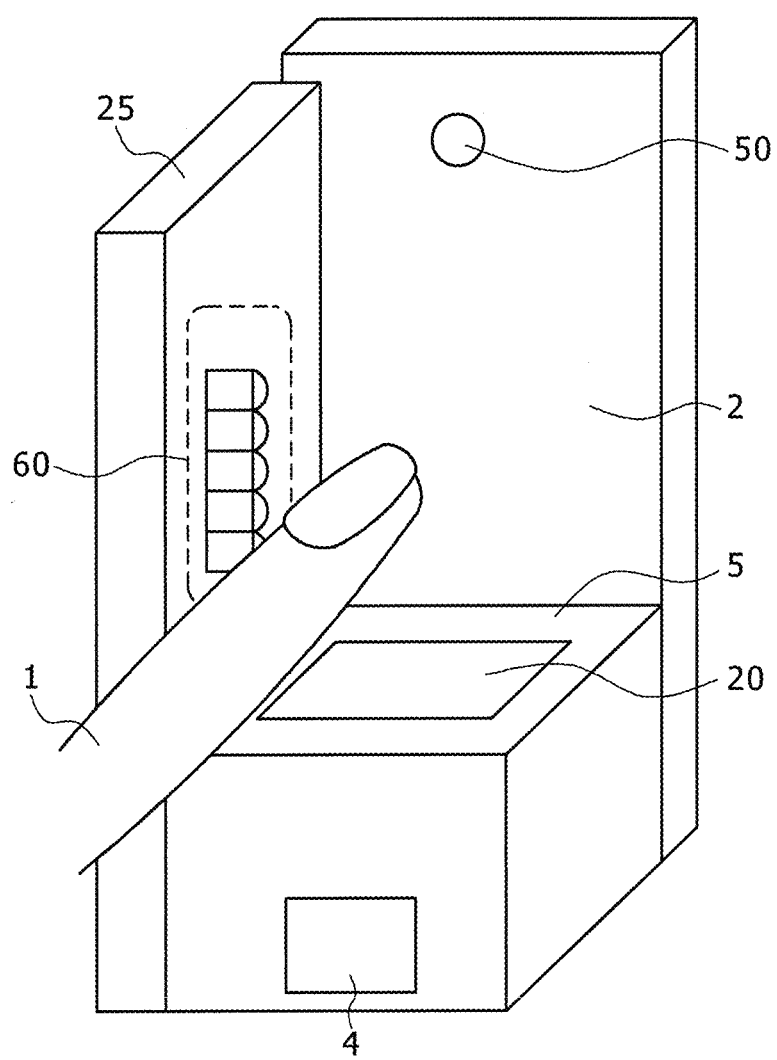
FIG. 16 shows an example of a shape of a finger vein data acquiring device.

FIG. 16 shows an outlook view of the vein data acquiring device 2 according to the seventh embodiment. The vein data acquiring device 2 is installed with the vein image taking light source 50 on a front upper side of the finger tip side. The image taking unit 4 is installed at a position on a lower side (palm side) of the finger 1 in a direction of capable of taking an image of the finger 1. There is a side wall at a side face of the finger 1. The side face 25 is installed with the light source unit 60 for measuring the finger position. The light source unit 60 is arranged to align vertically in a height direction, that is, in a direction of being remote from the finger placing base 5 as shown in FIG. 16.

When a user presents the finger 1, an image is taken by the image taking unit 4 by switching on one of the light sources of the light source unit 60. When a height of installing the light source and a height of presenting the finger are the same, light is irradiated to the finger 1, light is scattered at an inner portion of the finger 1, and therefore, a luminance of an image taken by the image taking unit 4 is increased. In a case where the position of presenting the finger is high or in a case where the position of presenting the finger is low relative to the position of installing the light source that is switched on, light emitted from the light sources passes on an lower side or an upper side of the finger. Therefore, a luminance of an image taken by the image taking unit 4 is lowered. Hence, in a case where the luminance of the taken image when the light source is switched on is higher than a constant value, it is determined that the finger is presented at a height same as that of the light source. The height presented by the finger 1 is measured by switching on the respective light sources of the light source unit 60 while shifting timings and confirming the luminance value of the taken image.

The position in the vertical direction of the finger 1 can be detected by aligning the light sources for measuring the light position in the height direction as described above.

When the method of the present embodiment is used in combination with the positional shift detection and the rotation correction by the light source portions aligned in the horizontal direction of the finger described in the first embodiment through the sixth embodiment, three-dimensional position information in a space of presenting the finger can be determined, and an authentication accuracy can further be improved.

Although the image of the vein is taken by switching on the vein image taking light source 50 similar to the first embodiment or the like after detecting the height in the vertical direction, the vein image may be taken by using the light source unit 60 similar to the sixth embodiment. The positional shift can be corrected and the highly accurate authentication system can be realized by the configuration described above even in a case where a positional shift in an up and down direction is brought about.

Eighth Embodiment

According to the present embodiment, an explanation will be given of a method of further improving the authentication accuracy by using the value of the finger width calculated from the image acquired for determining the contour position that is explained in the first embodiment through the seventh embodiment further for personal authentication.

According to an authentication system of the present embodiment, in the characteristic data configuration processing (S109) in registration and in authentication, the width of the finger of the user is registered to be included to characteristic data in addition to characteristics of a branch point and an end point of a blood vessel. In the checking processing (S112), a degree of coincidence of values of the finger width in registration and in authentication is calculated other than a rate of coincidence of the blood vessel pattern. In a case where fingers presented in registration and in authentication stay to be the same finger, both of the rate of coincidence of the blood vessel pattern and the rate of coincidence of the finger width are high. On the other hand, in a case where the fingers presented in registration and in authentication are different fingers, either or both of the rate of coincidence of the blood vessel patterns and the rate of coincidence of the finger widths indicate(s) a low value(s). Hence, in a case where the rate of coincidence of the patterns in registration and in authentication is high and the rate of coincidence of the finger widths is high, the authentication device of the eighth embodiment determines the same finger and determines the different fingers in the other case. When the authentication is executed by utilizing not only the blood vessel pattern but also the value of the finger width, an amount of information for identifying an individual is increased, and therefore, the authentication system with a higher accuracy can be realized.

Ninth Embodiment

According to the present embodiment, an explanation will be given of an authentication method for carrying out an authentication with a higher accuracy in a device having a narrow image taking range explained in other embodiment. It is effective to increase an amount of information for identifying an individual in order to improve an authentication accuracy. Hence, according to a ninth embodiment, an explanation will be given of a method of utilizing a light quantity value when an image of the vein is taken as information for identifying an individual.

As has been explained in the first embodiment, the authentication device of the present invention executes a light amount adjustment processing (S103) when an image of the vein is taken, and irradiates a finger of an image taking object with an optimum quantity of light. It is necessary to change a light quantity for each object of the image taking object because the optimum light quantity differs by a shape of a finger or a thickness of a skin. For example, when an image is taken by an authentication device of an upper irradiation system as shown in FIG. 16, the thicker the finger of the image taking object, the stronger light needs to be irradiated, the narrower the finger, the more weakly the light quantity needs to be set. Also, light is difficult to transmit through a finger having a stiffened and thickened skin which is mainly caused by skin roughness or the like, and therefore, when an image of the finger is taken, strong light tends to be needed. An intensity of light necessary when taking an image of the vein in this way represents a characteristic of the finger of the image taking object. Hence, a light quantity value is utilized as information for identifying an individual.

An explanation will be given of an embodiment of procedures of a registration processing and an authentication processing of the authentication device according to the ninth embodiment.

The registration processing executes the finger presentation processing (S101), the finger position detection processing (S102), the light quantity adjustment processing (S103), the pattern extraction processing (S108), and the characteristic data configuration processing (S109) in accordance with the flow of FIG. 5. Thereafter, the characteristic data is preserved (S110). The preserved data are the characteristic data configured based on a blood vessel pattern shape in the characteristic data configuration processing (S109), the data of a position of presenting the finger calculated in the finger position measurement processing (S102), and a value Ln of a light quantity when a target luminance value is reached in the light quantity adjustment processing (S103). The data are preserved in the storage device 14 and the registration processing is finished. Incidentally, when the light quantity value is preserved in a device installed with plural pieces of the light sources 50 as shown in FIGS. 8A, 8B, and 8C, absolute values of plural pieces of light quantity values may individually be preserved as they are, or relative values of the plural pieces of light quantity values may be preserved with a light quantity value of any one light source of the plural light sources as a reference. The light quantity value may be varied by being influenced by a variation in an image taking environment. However, a relative relationship among the light quantity values (for example, a relation that a light quantity value of a light source on a finger tip side is lower than a light quantity value of a root side light source or the like) can reflect only the characteristic of the finger without depending on the image taking environment. Therefore, an authentication strong at a variation in an environment of external light or the like can be carried out. Also, in a case of a device installed with a total of 4 pieces of the light sources 50 on a finger tip left side, a finger tip right side, a finger root left side, and a finger root right side as shown in FIGS. 8A, 8B, and 8C, light quantity values of 4 pieces of the light sources 50 may individually be preserved, or an average value of light quantities of two left and right pieces of the light sources 50 on the finger tip side and an average value of light quantities of two left and right pieces of the light sources 50 on the root side may respectively be calculated, and the calculated average values may be preserved. A size of registration data can be reduced more than when the plural light quantity values are individually preserved by calculating and preserving the average values. Generally, although the shape of the finger differs significantly between the finger tip side and the root side, there is frequently a case where shapes of the finger on the left side and the right side resemble each other. Therefore, although also the light quantity value in taking the image tends to differs between the finger tip side and the root side, the light quantity values on the left side and on the right side tend to resemble each other. Therefore, in the case of the device as shown in FIGS. 8A, 8B, and 8C, a highly accurate authentication can be carried out without deteriorating an authentication accuracy even when the amount of information is reduced by calculating the average value of the light quantity values of the left and the right light sources.

Figure 6:
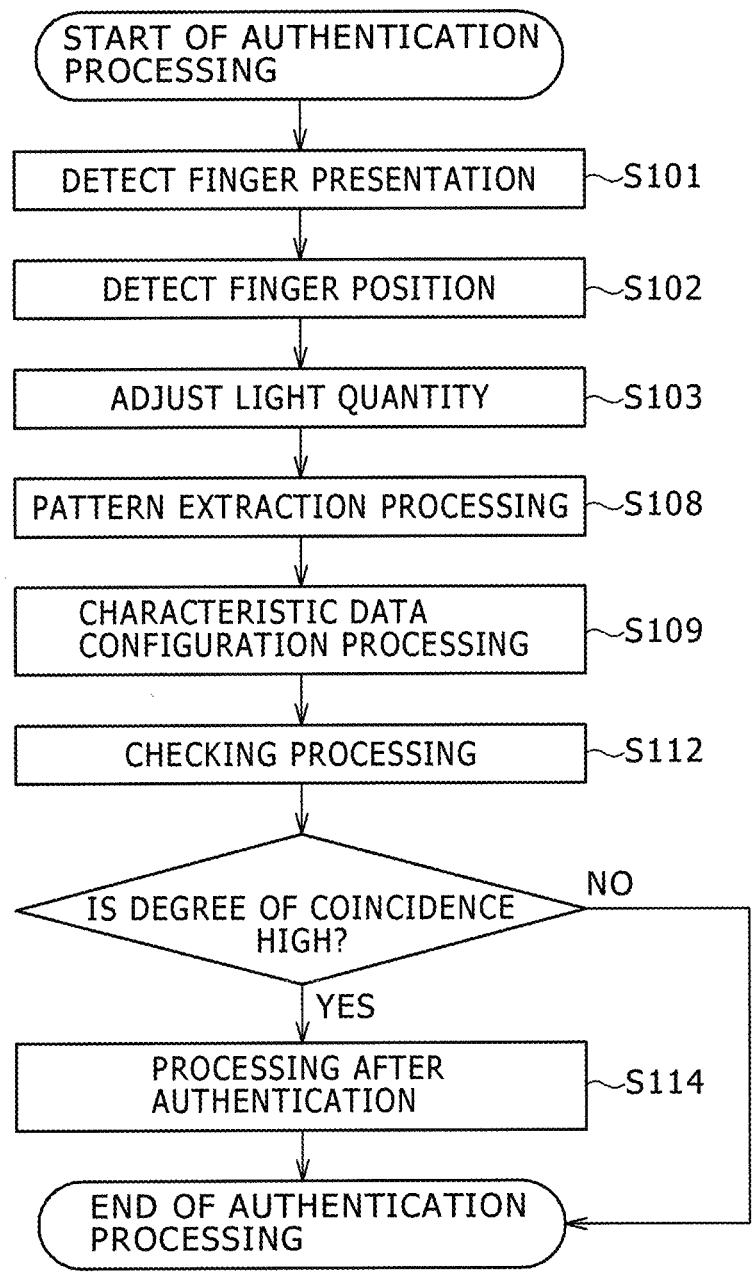
FIG. 6 shows an example of a flowchart of an authentication processing.

The authentication processing executes the finger presentation detection (S101), the finger position detection (S102), the light quantity adjustment (S103), the pattern extraction (S108), and the characteristic data configuration (S109) as shown in the flow of FIG. 6. Successively, the checking processing (S112) is carried out. In the checking processing (S112), also a degree of coincidence of the light quantity values Ln in registration and in authentication is calculated in addition to the rate of coincidence of the characteristic data based on the blood vessel pattern. In a case where both of the rate of coincidence of the blood vessel pattern and the rate of coincidence of the light quantity value are high, the same finger is determined, in a case where either or both of two kinds of the rates of coincidence is(are) equal to or lower than a threshold that is determined beforehand, different fingers are determined. The authentication is carried out by utilizing the information of the light quantity value other than the information of the blood vessel pattern, and therefore, an authentication system with a higher accuracy can be realized.

What is claimed is:

1. A blood vessel image taking device comprising:
a finger presentation area configured at a surface of a cabinet;
a plurality of light sources arranged at the finger presentation area for irradiating a presented finger with a light ray;
a light quantity controlling unit for controlling light quantities of the plurality of light sources;
an opening portion configured at the finger presentation area; and
an image taking unit for taking an image of the light ray from the light source portion passing through the opening portion and irradiated to the finger,
wherein portions of the finger presentation area are a tip end presentation area for presenting a tip end side of the finger, and a root presentation area for presenting a root side of the finger,
wherein in a case of defining a direction directed from a side of the tip end presentation area to a side of the root presentation area as a vertical direction, the plurality of light sources are aligned in a horizontal direction in a side direction of the opening portion,
wherein the light quantity controlling unit irradiates the light rays from the plurality of light sources while changing timings,
wherein the image taking unit respectively takes the images based on the respective light rays from the plurality of light sources, and
wherein a contour position of the presented finger in the finger presentation area is detected based on respective luminance values of the plurality of images.

2. A blood vessel image taking device comprising:
a finger presentation area configured at a surface of a cabinet;
an opening portion configured at the finger presentation area;
a plurality of light sources aligned in a side direction of the opening portion for irradiating a finger presented in the finger presentation area with a light ray;
a light quantity controlling unit for controlling light quantities of the plurality of light sources; and
an image taking unit for taking an image of the light ray from the light source portion passing through the opening portion,
wherein portions of the finger presentation area are a tip end presentation area for presenting a tip end side of the finger and a root presentation area for presenting a root side of the finger,
wherein in a case of defining a direction directed from a side of the front end presentation area to a side of the root presentation area as a presentation axis, the plurality of light sources are aligned above the finger presentation area such that axes of aligning the plurality of light sources and the presentation axis intersect each other,
wherein the light quantity controlling unit irradiates the light rays from the plurality of light sources while changing timings,
wherein the image taking unit respectively takes the images based on the respective light rays from the plurality of light sources, and
wherein a contour position of the presented finger is detected based on respective luminance values of the plurality of images.

3. The blood vessel image taking device according to claim 1, wherein the plurality of light sources are configured by a first light source portion and a second light source portion respectively aligned on both sides of the opening portion.

4. The blood vessel image taking device according to claim 1, wherein the light rays from the plurality of light sources are successively irradiated from a side of the light source arranged at a position having a long distance from the opening portion.

5. The blood vessel image taking device according to claim 1,
wherein the light source irradiating the light ray to the contour position of the finger is determined from the plurality of light sources based on the detected contour position, and
wherein the image taking unit takes a blood vessel image based on the light ray from the light source for irradiating the light ray to the contour position.

6. The blood vessel image taking device according to claim 5,
wherein the light quantity controlling unit controls the light quantity of the blood vessel image taking light source and the light quantity of the light source arranged at a position having a distance from the opening portion shorter than the distance from the opening portion of the blood vessel image taking light source in the plurality of light sources such that the light quantity of the light source having the shorter distance from the opening portion is smaller than the light quantity of the light source having the longer distance from the opening portion, and
wherein the image taking unit takes the blood vessel image based on the light ray from the light source the light quantity of which is controlled by the light quantity controlling unit.

7. The blood vessel image taking device according to claim 1, further comprising:
at least two of the blood vessel image taking light sources,
wherein the two blood vessel image taking light sources are respectively arranged diagonally via the opening portion,
wherein the two blood vessel image taking light sources irradiate the light rays in a diagonal direction, and
wherein the image taking unit takes the blood vessel image based on the light rays irradiated from the two blood vessel image taking light sources.

8. The blood vessel image taking device according to claim 1, wherein the blood vessel image taking device includes a plurality of the light source portions configured by the plurality of light sources, and the plurality of light sources are aligned in the vertical direction.

9. The blood vessel image taking device according to claim 8,
wherein the plurality of light source portions include at least a first light source portion and a second light source portion, and
wherein center positions of any light sources of the plurality of light sources configuring the second light source portion are arranged between respective center positions of the contiguous light sources of the plurality of light sources configuring the first light source portion.

10. The blood vessel image taking device according to claim 1, wherein the blood vessel image taking device includes a protrusion arranged at a position of presenting one side face of the finger on a side of being opposed to the light source portion configured in the side direction of the opening portion via the opening portion.

11. The blood vessel image taking device according to claim 1, wherein the plurality of light sources are configured on the side of the root area of the opening portion.

12. The blood vessel image taking device according to claim 1,
wherein a piece of finger width information of the presented finger is acquired from the detected contour position, and
wherein an authentication of an individual is executed by using the piece of finger width information.

13. The blood vessel image taking device according to claim 5, wherein an authentication of an individual is executed by using the blood vessel image.

14. The blood vessel image taking device according to claim 1, wherein the plurality of light sources are arranged such that the respective optical axes of the plurality of light sources do not intersect each other in a presenting space where the finger is presented.

15. The blood vessel image taking device according to claim 1, further comprising:
a height detecting light source portion configured by the plurality of light sources for detecting a height from the finger presentation area of the finger presented to the finger presentation area,
wherein the image taking unit respectively takes the images based on the light rays from the plurality of light sources configuring the height of detecting light source portion, and
wherein the height of the presented finger from the finger presentation area is detected based on the respective luminance values of the plurality of images.

* * * * *